(12) United States Patent
Lewis

(10) Patent No.: US 10,344,575 B2
(45) Date of Patent: Jul. 9, 2019

(54) PROCESS AND SYSTEM FOR PRODUCING CARBON DIOXIDE FOR ENHANCED OIL RECOVERY

(71) Applicant: Integrative Engineering, LLC, Houston, TX (US)

(72) Inventor: Michael J. Lewis, Houston, TX (US)

(73) Assignee: INTEGRATIVE ENGINEERING, LLC, Houston, TX (US)

( * ) Notice: Subject to any disclaimer, the term of this patent is extended or adjusted under 35 U.S.C. 154(b) by 260 days.

(21) Appl. No.: 15/297,478

(22) Filed: Oct. 19, 2016

(65) Prior Publication Data
US 2017/0101857 A1    Apr. 13, 2017

Related U.S. Application Data

(63) Continuation-in-part of application No. 14/742,974, filed on Jun. 18, 2015, now abandoned, which is a continuation-in-part of application No. 13/921,411, filed on Jun. 19, 2013, now abandoned, which is a
(Continued)

(51) Int. Cl.
| | |
|---|---|
| *E21B 43/16* | (2006.01) |
| *E21B 43/34* | (2006.01) |
| *F02C 6/18* | (2006.01) |
| *E21B 43/12* | (2006.01) |
| *C09K 8/594* | (2006.01) |
| *F02C 6/04* | (2006.01) |
| *B01D 53/62* | (2006.01) |
| *B01D 53/78* | (2006.01) |

(52) U.S. Cl.
CPC ............ *E21B 43/164* (2013.01); *C09K 8/594* (2013.01); *E21B 43/122* (2013.01); *E21B 43/34* (2013.01); *F02C 6/04* (2013.01); *F02C 6/18* (2013.01); *B01D 53/62* (2013.01); *B01D 53/78* (2013.01); *F05D 2220/32* (2013.01); *F05D 2260/61* (2013.01); *Y02E 20/14* (2013.01)

(58) Field of Classification Search
CPC ........ B01D 53/62; B01D 53/78; C09K 8/594; E21B 43/122; E21B 43/164; E21B 43/34; F02C 6/04; F02C 6/18; F05D 2220/32; F05D 2260/61; Y02E 20/14
See application file for complete search history.

(56) References Cited

U.S. PATENT DOCUMENTS

| | | |
|---|---|---|
| 4,499,946 A | 2/1985 | Martin et al. |
| 4,741,398 A | 5/1988 | Goldsberry |
| 4,824,447 A | 4/1989 | Goldsberry |

(Continued)

*Primary Examiner* — Cabrena Holecek
(74) *Attorney, Agent, or Firm* — Egbert Law Offices, PLLC

(57) ABSTRACT

A process for producing carbon dioxide for use in hydrocarbon recovery includes the steps of transporting a combustion turbine generator to an oilfield, operating the combustion turbine generator in combined cycle so as to produce steam, power and carbon dioxide, injecting the carbon dioxide into a reservoir located within the oilfield so as to produce hydrocarbons from the reservoir, and transmitting the power to a utility or for use by equipment at the oilfield. The combustion turbine generator has a size of no more than 175 megawatts. The combustion turbine generator operating in combined cycle has a heat rate of between 7,500 to 12,000 BTUs per hour. The carbon dioxide is compressed prior to be injected into the reservoir.

13 Claims, 16 Drawing Sheets

Related U.S. Application Data continuation-in-part of application No. 13/204,952, filed on Aug. 8, 2011, now abandoned.

(56) References Cited

U.S. PATENT DOCUMENTS

| | | |
|---|---|---|
| 4,899,544 A | 2/1990 | Boyd |
| 7,753,972 B2 | 7/2010 | Zubrin et al. |
| 2008/0283247 A1 | 11/2008 | Zubrin et al. |
| 2009/0236093 A1 | 9/2009 | Zubrin et al. |
| 2010/0314136 A1 | 12/2010 | Zubrin et al. |
| 2011/0067410 A1 | 3/2011 | Zubrin et al. |
| 2015/0089951 A1* | 4/2015 | Barckholtz ......... H01M 8/0625 60/772 |

* cited by examiner

PROCESS AND SYSTEM FOR PRODUCING CARBON DIOXIDE FOR ENHANCED OIL RECOVERY

CROSS-REFERENCE TO RELATED APPLICATIONS

The present application is a continuation-in-part of U.S. patent application Ser. No. 14/742,974, filed on Jun. 18, 2015, and entitled "System and Method for Producing Carbon Dioxide for Use in Hydrocarbon Recovery", presently pending. U.S. patent application Ser. No. 14/742,974 was a continuation-in-part of U.S. patent application Ser. No. 13/921,411, filed on Jun. 19, 2013, and entitled "Process for Enhanced Oil Recovery Using Capture of Carbon Dioxide", presently pending. U.S. patent application Ser. No. 13/921,411 is a continuation-in-part of U.S. patent application Ser. No. 13/204,952, filed on Aug. 8, 2011, and entitled "System and Method for Producing Carbon Dioxide for Use in Hydrocarbon Recovery", now abandoned.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to carbon dioxide injection for tertiary hydrocarbon recovery. More particularly, the present invention relates to portable power generators that can be used for producing the carbon dioxide gas for injection into a hydrocarbon-bearing formation. The present invention also relates to systems and methods whereby the carbon dioxide gas can be produced from the exhaust of a combustion turbine.

2. Description of Related Art Including Information Disclosed Under 37 CFR 1.97 and 37 CFR 1.98

The world's power demands are expected to rise 60% by 2030. The U.S. Energy Information Administration (EIA) estimates that fossil fuels will account for more than 75% of the world energy use by 2040 even though the share of coal will decline from 28% in 2012 to 22% in 2040, according to International Energy Outlook 2016 by EIA.

The U.S. currently produces approximately 9.1 million barrels of oil per day as of March 2016. Most of the oil fields in the United States are declining in oil recovery productivity. It has been proven that carbon dioxide can be used for enhanced oil recovery so as to increase oil recovery productivity in the declining fields. The Department of Energy estimates that up to 137 billion barrels of "stranded" oil can be recovered using carbon dioxide for enhanced oil recovery.

There are tens of thousands of depleted oil and natural gas reservoirs around the world, which collectively possess significant amounts of petroleum resources that cannot currently be extracted using conventional extraction techniques. For example, in a typical oil reservoir, only about 30% of the underground oil is recovered with primary production methods. An additional approximately 20% may be accessed by "secondary recovery" techniques, such as water flooding. In recent years, "tertiary recovery" techniques have been developed to recover additional oil from depleted reservoirs. Such tertiary recovery techniques include chemical injection, and gas injection. Using current methods, these tertiary techniques allow for an additional 20% or more of the original oil-in-place (OOIP) to be recovered.

Gas injection is one of the most common tertiary techniques with $CO_2$ being one of the preferred gases. In particular, carbon dioxide injection into depleted oil reservoirs has received considerable attention owing to its ability to mix with crude oil. Since the crude oil can be miscible with carbon dioxide, the injection of carbon dioxide renders the oil substantially less viscous and more readily extractable.

Carbon dioxide in quantities sufficiently large enough for commercial exploitation generally has come from three sources. One such source is the naturally occurring $CO_2$ found underground in areas such as Colorado, New Mexico, Wyoming, Mississippi, and other areas this also includes the $CO_2$ that is removed from natural gas streams in order to meet pipeline delivery specifications. A second source is that resulting from by-products of the operation of a primary process, such as the manufacture of ammonia or hydrogen from methane. A third source is found in the exhaust gases from burning of various hydrocarbon fuels. Regardless of the source one of the largest problems that is faced by carbon dioxide users is the problem of transportation from the place of production to the point of use.

Problems exist within the current carbon dioxide pipeline infrastructure in that extensions into potentially productive areas are costly and somewhat limited due to the availability of high purity carbon dioxide. Even in areas that have relatively close proximity to an existing carbon dioxide pipeline, extensions to potential producing areas are costly and time-consuming. The single greatest problem is the lack of commercial quantities of carbon dioxide in close proximity to the oil fields that are in need of this resource to produce the remaining reserves that are recoverable by using the tertiary recovery methods. This problem is exacerbated when the field is remote from an existing carbon dioxide pipeline and/or is not of sufficient size to justify the costly extension of the pipeline infrastructure. Because a reservoir in an oilfield undergoing tertiary recovery will begin to recycle quantities of carbon dioxide that are recovered along with the tertiary oil, the need for carbon dioxide in the tertiary oil-producing respectively will diminish significantly over time. This necessitates the recovery of pipeline infrastructure capital costs quickly.

Currently, carbon dioxide is present in low concentrations, such as within the flue gas from power generation facilities. These plants are found all over the United States and can be fired from a variety of hydrocarbon sources, including coal, fuel oil, biomass, and natural gas. Unfortunately, these facilities are most often located near large water sources due to their need to use this water for cooling during the power production process. In addition, these are very large facilities with a long economic life. There are many oil fields that are not located within a sufficiently close proximity to such existing large power generation facilities in order to attempt to economically utilize a carbon capture technology and pipeline delivery method to provide the carbon dioxide to the oilfields that have this need.

Combustion turbine generators operating in combined cycle are known in the prior art. Virtually all of these combustion turbine generators operating in combined cycle are used in electrical generating facilities, such as power plants. Modern large combustion turbine generators operating in combined cycle have highly efficient heat rates. As a result of this high efficiency, a smaller amount of carbon dioxide is produced per unit of power production. In the past, less efficient combustion turbines operating in combined cycle were also developed. These prior combustion turbines operating in combined cycle required a larger amount of fuel in order to produce the same amount of power. However, these earlier less efficient combustion turbines operating in combined cycle actually produced a larger amount of carbon dioxide per unit of power. Current trends are to continue the improvement of technology with combustion turbines operating in combined cycle so that they become increasingly efficient maximizing the amount of power produced relative to the amount of fuel consumed. As such, the earlier less efficient combustion turbines operating in combined cycle have been relegated to a variety of other uses, such as in ships and industrial facilities.

Heretofore, the combustion turbines operating in combined cycle have found little application in the oilfield. To the extent that these combustion turbine generators operating in combined cycle have been utilized in the oilfield, the carbon dioxide output has been typically discharged to the atmosphere and have only been employed to provide electricity for oilfield operations.

In the past, various patents have been issued relating to the production of carbon dioxide for tertiary hydrocarbon recovery. For example, U.S. Pat. No. 4,499,946, issued on Feb. 19, 1985 to Martin et al., provides a portable, above-ground system and process for generating combustion gases and for injecting the purified nitrogen and carbon dioxide at controlled temperatures into a subterranean formation so as to enhance the recovery thereof. The system includes a high-pressure combustion reactor for sufficient generation of combustion gases at the required rates and at pressures up to about 8000 p.s.i. and temperatures up to about 4500° F. The reactor is water-jacketed and lined with refractory material to minimize soot formation.

U.S. Pat. No. 4,741,398, issued on May 3, 1988 to F. L. Goldsberry, shows a hydraulic accumulator-compressor vessel using geothermal brine under pressure as a piston to compress carbon dioxide-rich gas. This is used in a system having a plurality of gas separators in tandem to recover pipeline quality gas from geothermal brine. A first high pressure separator feeds gas to a membrane separator which separates low pressure waste gas from high pressure quality gas. A second separator produces low pressure waste gas. Waste gas from both separators is combined and fed into the vessel through a port at the top as the vessel is drained for another compression cycle.

U.S. Pat. No. 4,824,447, issued on Apr. 25, 1989 to F. L. Goldsberry, describes an enhanced oil recovery system which produces pipeline quality gas by using a high pressure separator/heat exchanger and a membrane separator. Waste gas is recovered from both the membrane separator and a low pressure separator in tandem with the high pressure separator. Liquid hydrocarbons are skimmed off the top of geothermal brine in the low pressure separator. High pressure brine from the geothermal well is used to drive a turbine/generator set before recovering waste gas in the first separator. Another turbine/generator set is provided in a supercritical binary power plant that uses propane as a working fluid in a closed cycle and uses exhaust heat from the combustion engine and geothermal energy of the brine in the separator/heat exchanger to heat the propane.

U.S. Pat. No. 4,899,544, issued on Feb. 13, 1990 to R. T. Boyd, discloses a cogeneration/carbon dioxide production process and plant. This system includes an internal combustion engine that drives an electrical generator. A waste heat recovery unit is provided through which hot exhaust gases from the engine are passed to recover thermal energy in a usable form. A means is provided for conveying exhaust gases coming out of the waste heat recovery unit to a recovery unit where the carbon dioxide is extracted and made available as a saleable byproduct.

U.S. Pat. No. 7,753,972, issued on Jul. 13, 2010 to Zubrin et al., discloses a portable energy system for enhanced oil recovery. This is a truck mobile system that reforms biomass into carbon dioxide and hydrogen. The gases are separated. The carbon dioxide is sequestered underground for enhanced oil recovery and the hydrogen used to generate several megawatts of carbon-free electricity.

U.S. Patent Publication No. 2008/0283247, published on Nov. 20, 2008 to Zubrin et al., shows a portable, modular apparatus for recovering oil from an oil well and generating electric power. This system includes a chassis to support a fuel reformer, a gas separator, a power generator, and/or a compressor. The fuel reformer module is adapted to react a fuel source with water to generate a driver gas including a mixture of carbon dioxide gas and hydrogen gas. The gas separator module is operatively coupled to the reformer module and is adapted to separate at least a portion of the hydrogen gas from the rest of the driver gas. The power generator module is operatively coupled to the gas separator module and is adapted to generate electric power using a portion of the separated hydrogen gas. The compressor module is operatively connected to the reformer module and is adapted to compress a portion of the driver gas and to eject the driver gas at high pressure into the oil well for enhanced oil recovery.

U.S. Patent Publication No. 2009/0236093, published on Sep. 24, 2009 to Zubrin et al., shows a method for extracting petroleum by using reformed gases. This method includes reforming a fuel source by reaction with water to generate driver gas and injecting the driver gas into the oil well. The reforming operation includes causing the combustion of a combustible material with ambient oxygen for the release of energy. A reforming reaction fuel and water is heated with the energy released from this heating process. This is at a temperature above that required for the reforming reaction in which the fuel and water sources are reformed into the driver gas.

U.S. Patent Publication No. 2004/0314136, published on Dec. 16, 2010 to Zubrin et al., discloses an in-situ apparatus for generating carbon dioxide gas at an oil site for use in enhanced oil recovery. The apparatus includes a steam generator adapted to boil and superheat water to generate a source of superheated steam, as well as a source of essentially pure oxygen. The apparatus also includes a steam reformer adapted to react a carbonaceous material with the superheated steam and the pure oxygen, in an absence of air, to generate a driver gas made up of primarily carbon dioxide gas and hydrogen. A separator is adapted to separate at least a portion of the carbon dioxide gas from the rest of the driver gas to generate a carbon dioxide-rich driver gas and a hydrogen-rich fuel gas. A compressor is used for compressing the carbon dioxide-rich driver gas for use in enhanced oil recovery.

U.S. Patent Publication No. 2011/0067410, published on Mar. 24, 2011 to Zubrin et al., teaches a reformation power plant that generates clean electricity from carbonaceous material and high pressure carbon dioxide. The reformation power plant utilizes a reformation process that reforms carbonaceous fuel with super-heated steam into a high-pressure gaseous mixture that is rich in carbon dioxide and hydrogen. This high-pressure gas exchanges excess heat with the incoming steam from a boiler and continues onward to a condenser. Once cooled, the high-pressure gas goes through a methanol separator, after which the carbon dioxide-rich gas is sequestered underground or is re-used. The remaining hydrogen-rich gas is combusted through a gas turbine. The gas turbine provides power to a generator and also regenerative heat for the boiler. The generator converts mechanical energy into electricity, which is transferred to the electric grid.

It is an object of the present invention to provide a system for use in hydrocarbon recovery that places a high purity carbon dioxide source close to the hydrocarbon-bearing formation.

It is another object of the present invention to provide a system for introducing carbon dioxide for use in hydrocarbon recovery which is portable.

It is still another object of the present invention to provide a system for producing carbon dioxide for use in hydrocarbon recovery that can be permitted as a minor emission source.

It is still a further object of the present invention to provide a system for producing carbon dioxide for use in hydrocarbon recovery which can be delivered in short order to a desired location.

It is a further object of the present invention to provide a system for producing carbon dioxide for use in hydrocarbon recovery that allows power to be sold into the power grid and for use in the enhanced oil recovery operations.

It is still another object of the present invention to provide a system for producing carbon dioxide for use in hydrocarbon recovery in a manner that is environmentally beneficial.

It is still a further object of the present invention to provide a system for producing carbon dioxide for use in hydrocarbon recovery which minimizes site work and field construction costs and equipment.

These and other objects and advantages of the present invention will become apparent from a reading of the attached specification and appended claims.

BRIEF SUMMARY OF THE INVENTION

The present invention is a process for producing carbon dioxide for use in hydrocarbon recovery. The process includes the steps of: (1) transporting a COGEN Plant, having a combustion turbine generator that produces up to 175 MW of power to an oilfield; (2) operating the combustion turbine in combined cycle so as to produce power, carbon dioxide and steam; (3) injecting the carbon dioxide into the oilfield reservoir so as to produce hydrocarbons from the reservoir; and (4) transmitting the power to a utility or for use by equipment at the oilfield.

In the present invention the size of the COGEN Plant is selected such that the components can be transported via a road. The step of transporting includes placing the unassembled components of the COGEN Plant on the beds of trailers and/or trucks. The trucks and trailers carry the unassembled COGEN Plant. The components include a combustion turbine generator, a recovery steam generator and a steam turbine generator. The unassembled GOGEN Plant is removed from the beds of the trucks and trailers when the vehicles reach a desired location at the oilfield. The combined cycle stem generator has a heat rate of between 7,500 and 12,000 BTUs per hour.

In the process of the present invention, the carbon dioxide is compressed prior to the step of injecting. Specifically, the carbon dioxide from the COGEN Plant is absorbed with a solution. The mixture of the solution and the carbon dioxide is re-boiled so as to release carbon dioxide from the solution. The released carbon dioxide is then passed to the compressor. The step of re-boiling includes passing the steam from the COGEN Plant so as to exchange heat with the solution so as to elevate a temperature of the solution such that the carbon dioxide is released therefrom. The process of the present invention further includes drilling a well at the oilfield site so as to produce water from the well. The produced water is passed to the COGEN Plant so as to supply fresh water to the COGEN Plant. Specifically, the water from the well is or may be brackish water. The brackish water is filtered so as to produce fresh water that is delivered to the COGEN Plant. The reject water that is filtered from the brackish water is then discharged.

Fuel is supplied to the COGEN Plant so as to cause the COGEN Plant to operate. The fuel is supplied from a natural gas pipeline. Alternatively or in combination, the fuel that is supplied can be a field gas.

Within the COGEN Plant, the hot exhaust flue gas passing through the heat recovery steam generator (HRSG) produces steam. The volume of steam from HRSG is passed to a steam turbine generator. The steam turbine generator will then produce power which can be delivered to a utility or for use by equipment at the oilfield.

The carbon dioxide is injected into the reservoir such that the hydrocarbon fluids, hydrocarbon gases, water and the carbon dioxide are produced from the reservoir. The combined hydrocarbon gases and carbon dioxide are first separated from the combined fluids. Then the carbon dioxide is separated from the hydrocarbon gases. The carbon dioxide is then returned to a compressor prior to the step of injecting. The combined fluids are separated with the hydrocarbon liquids being delivered to oil storage and the produced water is delivered to a produced water plant.

The present invention is also a system for enhanced oil recovery. The system includes a COGEN Plant having a size of no more than 175 megawatts. The COGEN Plant, which is portable, will produce a steam output and a power output and a carbon dioxide output. The COGEN Plant has a heat rate of between 7,500 and 12,000 BTUs per hour. A compressor is operated with electricity produced by the COGEN Plant and will compress the carbon dioxide to the pressure required for injection into the oilfield. An injection pipe is adapted to open into a reservoir located within an oilfield. The compressor is connected or interconnected to the injection pipe so as to pass the compressed carbon dioxide through the injection pipe into the reservoir. A line is connected to the COGEN Plant so as to pass the power output from the COGEN Plant to a utility or for other use at the oilfield.

A carbon dioxide capture plant is connected to the COGEN Plant and to the compressor. The carbon dioxide capture plant includes a solvent contactor vessel therein such that the carbon dioxide output is absorbed into a solvent forming a carbon dioxide-rich solution. The carbon dioxide capture plant has a re-boiler in heat exchange relation with the steam output of the COGEN Plant such that the steam output elevates a temperature of the carbon dioxide-rich solution so as to release the carbon dioxide from the solution. The compressor is connected or interconnected to the re-boiler such that the released carbon dioxide is delivered to the compressor.

A water supply plant is connected to the COGEN Plant so as to supply water to the COGEN Plant. The water supply plant is connected to a well so as to receive brackish water from the well. The water supply plant incorporates a filter system therein so as to separate fresh water from the brackish water. The fresh water is supplied to the COGEN Plant. A fuel supply is also connected to the COGEN Plant. The fuel supply can be either natural gas and/or a combination of natural gas and field gas.

A production pipe extends so as to be open to the reservoir. The production pipe is adapted to pass hydrocarbons outwardly from the reservoir as the compressed carbon dioxide is passed into the reservoir. A carbon dioxide recycle plant is connected or interconnected to the production pipe so as to separate carbon dioxide from the hydrocarbons as passed by the production pipe. The carbon dioxide recycle plant is connected or interconnected to the compressor such that the separated carbon dioxide gas passes to the compressor. A steam turbine is incorporated to the COGEN Plant such that the steam output from the COGEN Plant causes the steam turbine to produce a power output.

The foregoing Summary of the Invention section is intended to describe, with particularity, the preferred embodiments of the present invention. It is understood that modifications to these preferred embodiments can be made within the scope of the present claims. As such, this Section should not be construed, in any way, as limiting of the broad scope of the present invention. The present invention should only be limited by the following claims and their legal equivalents.

DETAILED DESCRIPTION OF THE INVENTION

Figure 1:
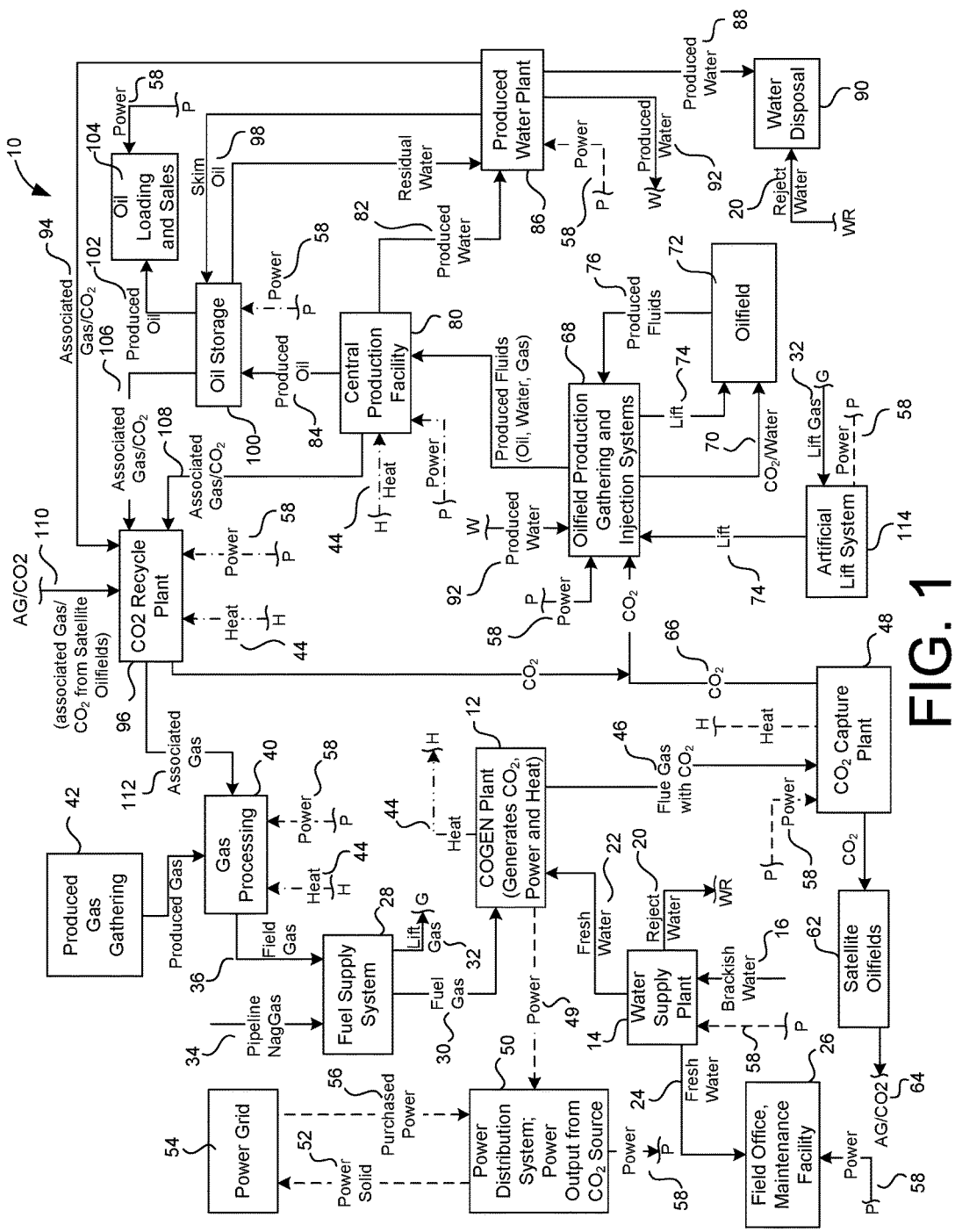
FIG. 1 is a block diagram showing the process steps associated with the enhanced oil recovery process of the present invention.

Referring to FIG. 1, there is shown the enhanced oil recovery process 10 in accordance with the present invention. In particular, the present invention utilizes a COGEN Plant 12 having a combustion turbine generator operating in combined cycle therein. The details associated with the COGEN Plant 12 are illustrated in greater detail in FIG. 2. In particular, the COGEN Plant 12 receives a fresh water supply 22 from a water supply plant 14. The water supply plant 14 can be connected to a water well 16 such that the water well 16 can supply brackish water to the water supply plant 14. Power 58 from the power distribution system 50 can be utilized by the water supply plant 14. The water supply plant 14 includes a filter system such that reject water 20 can be discharged therefrom. As a result, fresh water 22 is delivered to the COGEN Plant 12. The fresh water 24 can also be delivered to the field office and maintenance facility 26.

A fuel supply system 28 serves to deliver fuel to the COGEN Plant 12 so as to power the COGEN Plant therein. The fuel gas 30 is delivered to the COGEN Plant 12. Also, the fuel gas can be utilized as a lift gas 32, as will be described hereinafter, with an artificial lift system 114. The fuel supply system 28 receives natural gas from a pipeline 34 and/or from the field gas 36. When the field gas 36 is utilized, there must be a gas processing plant 40 for treating the gas. In particular, the field gas is gathered from both the field gas gathering operations 42 and the carbon dioxide recycling plant 96, and delivered to the field gas processing system 40. Additionally, as will be described hereinafter, heat and power are provided to the gas processing system 40 from the COGEN Plant 12.

The COGEN Plant 12 produces heat 44 as an output and delivers the heat 44 throughout the process 10. Additionally, the flue gas 46 is delivered to the carbon dioxide capture plant 48. The heat 44 from the COGEN Plant 12 is also delivered to the carbon dioxide capture plant 48.

The COGEN Plant 12 also produces a power output 49. This power output 49 is delivered to a power distribution system 50. The power distribution system 50 allows power 52 to be sold to the power grid 54. The power distribution system 50 can also purchase power 56 from the power grid 54. The power distribution system 50 provides a power output 58 that is used throughout the process 10. For example, power 58 can be delivered to the carbon dioxide capture plant.

The carbon dioxide output 60 produced from the carbon dioxide capture plant is delivered to the satellite oilfields 62. As a result, the satellite oilfields 62 can use the carbon dioxide 60 so as to produce a gas mixture of carbon dioxide and hydrocarbons 64.

The carbon dioxide output 66 from the carbon dioxide capture plant 48 is delivered to the oilfield production, gathering and injection systems 68. As such, this carbon dioxide 66 can be passed in pipes alternating with water 92 to the oilfield 72. Lift gas 74 from the artificial lift system 114 is delivered to the oilfield production, gathering and injection systems 68. As such, the lift gas 74 can be passed to the oilfield 72. The injection of the lift gas helps the oilfield 72 to produce fluids 76, a combination of hydrocarbon fluids, associated hydrocarbon gases, water and injected carbon dioxide.

The production fluids 76 are passed from the oilfield production, gathering and injection system 68 to a central processing facility 80. The central processing facility 80 receives power 58 from the power distribution system 50. The central processing facility 80 also receives heat 44 from the COGEN Plant 12. As a result, the central processing facility can discharge; produced water 82, produced oil 84, and produced-associated gas and carbon dioxide 108. As will be described hereinafter, the central production facility 80 can include equipment necessary to separate the produced associated gas and carbon dioxide 108 from the combined produced water and produced oil 84, and then the produced water 82 from the produced oil 84 so that the separation can occur. The produced water 82 is delivered to a produced water plant 86. Power 58 from the power distribution system 50 can be utilized by the produced water plant so as to operate pumps The produced water can be delivered as disposal water 88 to a water disposal unit 90. Similarly, the reject water 20 from the water supply plant 14 can also be delivered to the water disposal unit 90.

The produced water plant 86 can also deliver produced water 92 for the purpose of injection use by the oilfield production, gathering and injection system 68.

The produced water plant 86 will serve to separate remaining gases, including carbon dioxide, from the produced water. As such, these gases 94 can be delivered to a recycle plant 96. The produced water plan 86 also skims oil from the surface of the produced water. The skim oil 98 can be passed to the oil storage 100.

The oil found in the oil storage 100 can be delivered as produced oil 102 to an oil loading and sales facility 104. Power 58 from the power distribution system 50 can be utilized by the oil loading and sales facility 104 so as to operate pumps, filters, and other mechanisms. Also, the power 58 is delivered to the oil storage 100 for the purposes of recovering gases 106 separated from the oil. These gases 106 can also be delivered to the recycle plant 96.

The central production facility 80 further serves to separate gases 108 from the produced oil. Once again, these gases 108 are delivered to the recycle plant 96.

In order to process the gases 94, 106 and 108 at the recycle plant 96, heat 44 from the COGEN Plant 12 and power 58 from the power distribution system 50 are delivered to the carbon dioxide recycle plant 96. Additionally, any other associated gases or carbon dioxide 110 from the satellite oilfields 62 can also be passed to the carbon dioxide recycle plant. As a result, the carbon dioxide recycle plant 96 can deliver carbon dioxide back for use at the oilfield production, gathering and injection system 68. The separated associated gases 112 are delivered to the gas processing system 40. The gas processing system 40 utilizes heat 44 from the COGEN Plant 12 and also utilizes power 58 from the power distribution system 50 so as to process the gas. As a result, the field gas 36 can be properly delivered to the fuel supply system for use by the COGEN Plant 12.

An artificial lift system 114 serves to provide lift gas 74 to the oilfield production, gathering and injection system 68. As a result of the unique process, the same fuel gas 30 from the fuel supply system 28 can be used temporarily, without loss, as a lift gas 32 provided to the artificial lift system 114 and subsequently will be returned to the fuel supply system 28 after being separated from the produced hydrocarbons at the central production facility 80. Similarly, power 58 from the power distribution system 50 can be supplied so as to operate the artificial lift system.

Figure 2:
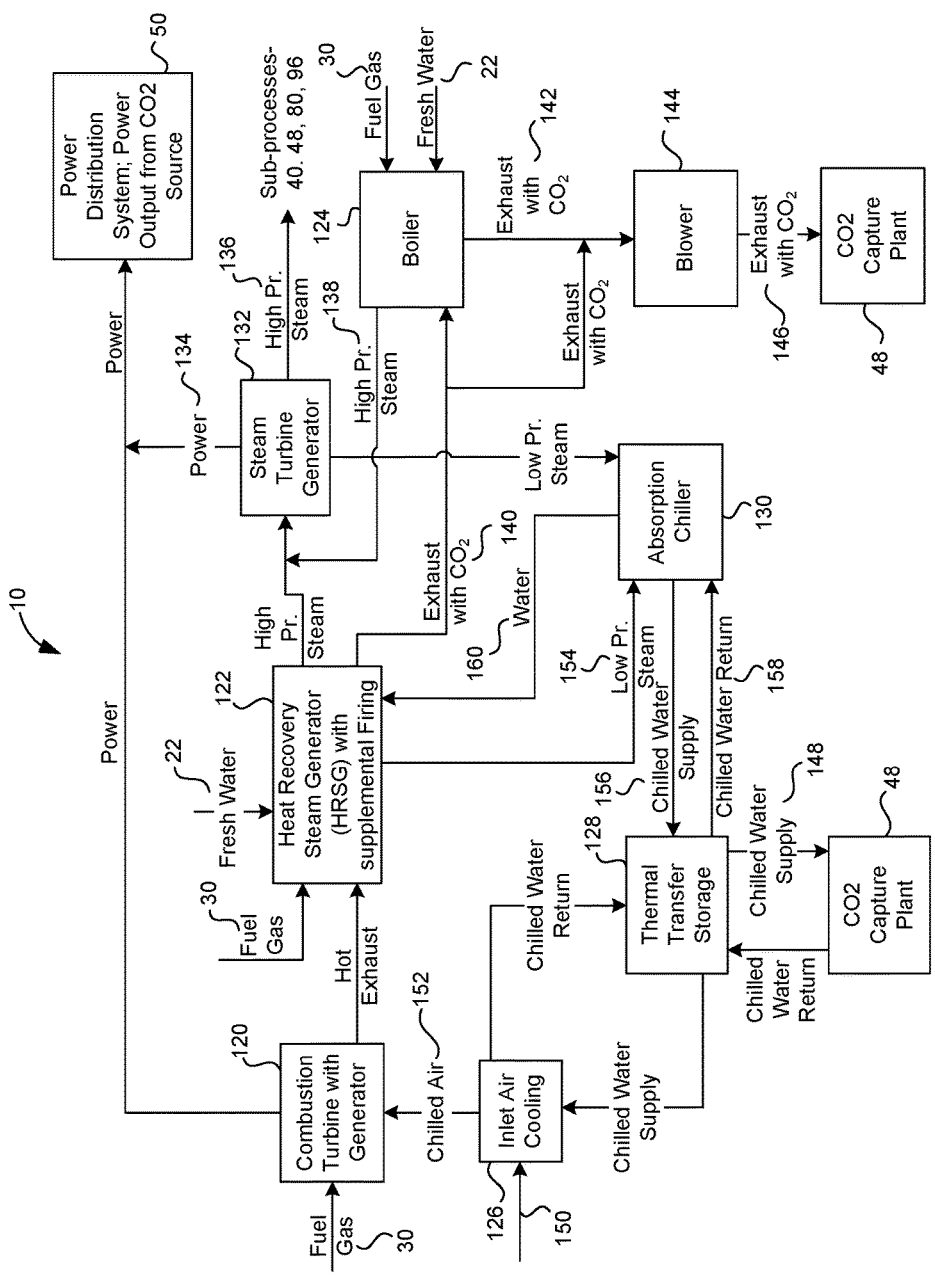
FIG. 2 is a block diagram illustrating the operation of the COGEN Plant of the enhanced oil recovery process of the present invention.

FIG. 2 is a flowchart showing the operation of the COGEN Plant 12. The primary source of carbon dioxide for the enhanced oil recovery process of the present invention is the combustion turbine with generator 120. The combustion turbine with generator 120 is custom-configured to meet the requirements of the particular enhanced oil recovery process. In particular, and as will be described hereinafter, the COGEN Plant will have a maximum size of 175 megawatts. As such, combustion turbine with generator 120 can be transported to the site. The combustion turbine with generator 120 when unassembled can be loaded onto the beds of trucks and/or trailers of trucks. The trucks can then travel along a roadway to the oilfield. The combustion turbine with generator 120 can then be unloaded from the trailer and be assembled at a desired location at the oilfield.

Importantly, in the present invention, the combustion turbine with generator is only a moderately efficient power generator. As was described previously, very efficient combustion turbine generators operating in combined cycle will produce a great deal of power per unit of carbon dioxide. With the present invention, it is desirable to create a more concentrated mixture of carbon dioxide so that the carbon dioxide can be used for the production of oil. As such, very efficient combustion turbine generators operating in combined cycle having a heat rate less than 7,500 BTUs per hour would not be applicable to the present invention. On the other hand, inefficient combustion turbine generators operating in combined cycle would also be impractical for use in the present invention. For those combustion turbine generators operating in combined cycle having a heat rate of more than 12,500 BTUs per hour, would utilize more fuel per unit of power produced than would be economic. As such, this would be contrary to the desired operation of the present invention. As a result of using only moderately efficient combustion turbine generators operating in combined cycle for use as the COGEN Plant, refurbished turbines can be used in the present invention. These used and refurbished turbines are less expensive and are often readily available. As such, it is not necessary to wait for delivery of the modern high-efficiency combustion turbine generators operating in combined cycle for use as the COGEN Plant. As such, the present invention would work against conventional thinking in that, in virtually all other applications, it is desirable to maximize the amount of energy produced with the minimum amount of fuel consumed by the combustion turbine generator operating in combined cycle while minimizing the amount of carbon dioxide produced in the exhaust flue gas. It is believed that the higher levels of carbon dioxide could strongly work against the desired carbon footprint of the combined cycle combustion turbine generator 120. The present invention, on the other hand, desirably results in a higher concentration of carbon dioxide in the exhaust flue gas, the majority of which is absorbed and efficiently utilized in the process 10 of the present invention, and not released into the atmosphere. As a result, and as will be described hereinafter, the process 10 will actually produce a negative carbon footprint. As such, the present invention is able to minimize the costs associated with acquiring and operating such moderately efficient combustion turbine generators operating in combined cycle, while also enhancing the environmental benefits of such a generator.

The purpose of the combustion turbine with generator 120 is to provide power in the form of electricity to the various sub-processes shown in FIG. 1 via the power distribution system 50. The combustion turbine with generator 120 also provides heat via hot exhaust which helps convert fresh water to steam in the heat recovery steam generator 122. This high pressure steam is used to produce additional power in the steam turbine generator 132, combining with the power generated by the combustion turbine with generator 120. The heat, in the form of steam, from the steam turbine generator 132 can be utilized by various sub-processes shown in FIG. 1. In case of increased requirement of carbon dioxide, a portion of the exhaust from the combustion turbine with generator 120 still containing 12-14% oxygen is diverted into the boiler 124 where it is combined with fuel gas 30 and combusted. This process converts fresh water to high pressure steam 138 which is directed to steam turbine generator 132 to produce power and to supplement heat. The exhaust 142 with an increased carbon dioxide concentration from the boiler is recombined with the exhaust from the heat recovery steam generator 122 that was not diverted to the boiler and moved through a blower 144 to raise its pressure slightly before it is piped 146 to the CO2 Capture Plant 48. The transportable COGEN Plant requires a hydrocarbon fuel supply that is provided by the fuel supply system 28. The fuel supply system 28 is custom configured for the process of the present invention for each enhanced oil recovery operation. The most common fuel supply is pipeline-supplied natural gas. To optimize the power output, the combustion turbine with generator is configured with inlet air chilling 126 that utilizes cold water circulated from the thermal transfer storage system 128. The thermal transfer storage system 128 holds cold water for which the temperature is maintained by the absorption chiller 130, which obtains the heat necessary to operate from the steam provided by the heat recovery steam generator 122.

As can be seen in FIG. 2, the high-pressure steam from the heat recovery steam generator 122 is delivered to a steam turbine generator 132. Steam turbine generator 132 produces a power output 134 that can be delivered to the power distribution system 50. The high-pressure steam 136 from the steam turbine 132 can then be utilized in the various sub-processes shown in FIG. 1.

The carbon dioxide capture plant 48 can use chilled water from the thermal transfer storage unit 128. Chilled water 148 can be delivered for use by the carbon dioxide capture plant. The thermal transfer storage unit 128 receives returned water from the inlet air cooling 126 to be re-chilled and delivers chilled water to the inlet air cooling 126. A supply of air 150 can be delivered into the inlet air cooling 126. As a result, chilled air 152 can be delivered to the COGEN Plant 120 so as to enhance the operational characteristics of the combustion turbine generator 120.

The absorption chiller 130 receives low-pressure steam 154 from the heat recovery steam generator 122 and the steam turbine 132. The absorption chiller 130 delivers the chilled water supply 156 to the thermal transfer storage unit 128 and receives returned water 158 from the thermal transfer storage unit 128 to be re-chilled. The absorption chiller 130 further returns water 160 condensed from the low pressure steam back to the heat recovery steam generator 122. Fresh water 22 from the water supply plant 14 is delivered for use by the heat recovery steam generator 122 to produce steam.

Figure 3:
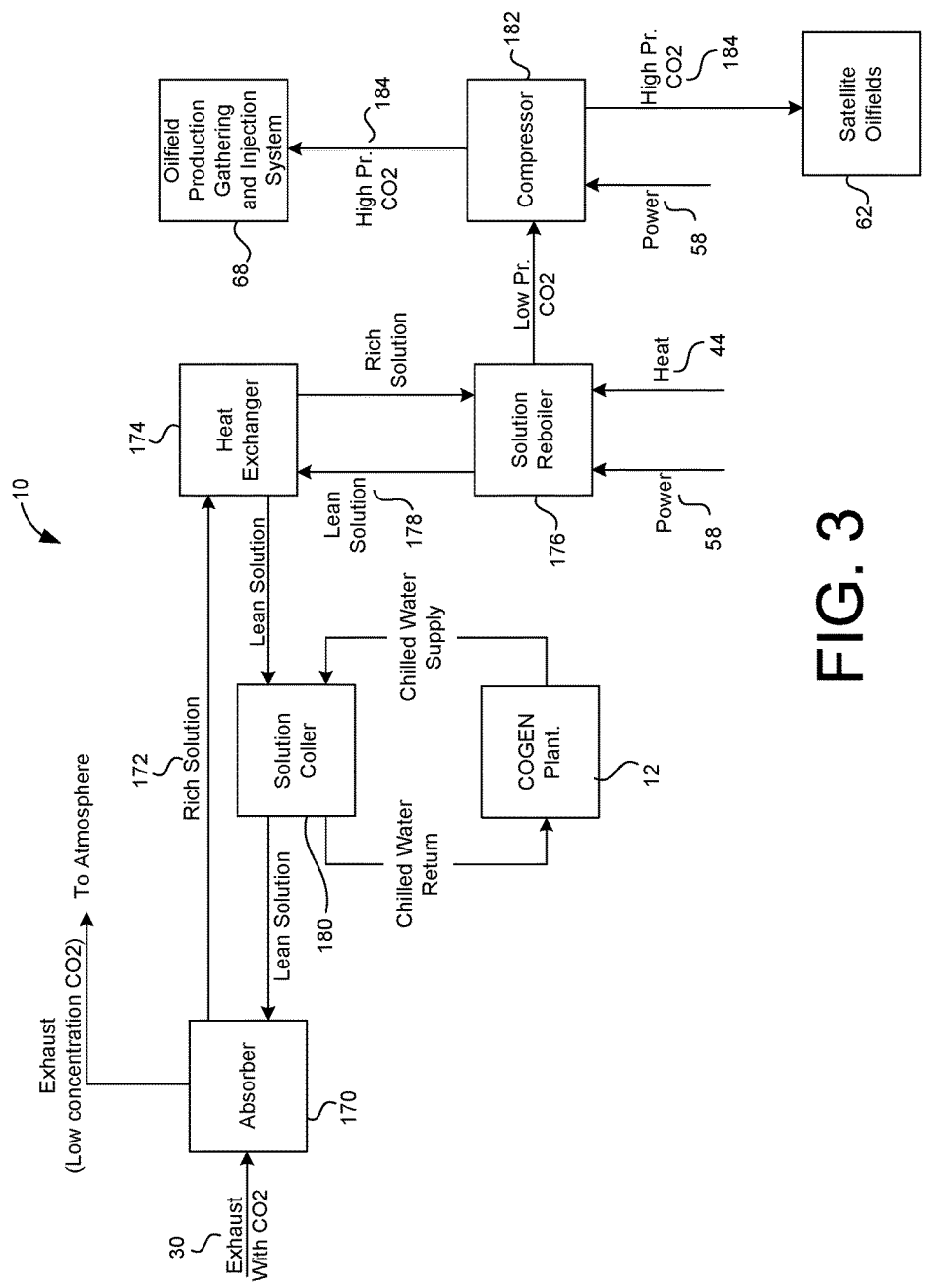
FIG. 3 is a block diagram showing the operation of the carbon dioxide capture plant of the enhanced oil recovery process of the present invention.

FIG. 3 shows the carbon dioxide capture plant 48. The carbon dioxide capture plant will be dependent upon the COGEN Plant 12 for power, heat and the exhaust flue gas stream containing the carbon dioxide. The carbon dioxide capture plant 48 is composed of multiple vessels transported to the site, either assembled or unassembled. The exhaust flue gas 30 of the COGEN Plant 12 is processed in the carbon dioxide capture plant 48. An absorber 170 serves to absorb the carbon dioxide by bringing the flue gas into contact with a solvent. Following absorption the solution is rich in content of carbon dioxide. The rich solution 172 is delivered to the heat exchanger 174 to preheat the rich solution 172 by exchanging heat from the hot lean solution 178 delivered from the reboiler 176. The heat exchanger 174 will deliver the preheated rich solution to a solution reboiler 176. The solution reboiler 176 is supplied with heat 44 from the COGEN Plant 12 and supplied with power 58 from the power distribution system 50. As a result, the rich solution saturated with carbon dioxide is heated to a high temperature releasing the carbon dioxide and creating a high temperature lean solution 178 containing very little, carbon dioxide. This high temperature lean solution is passed to the heat exchanger 174 where the high temperature lean solution 178 is pre-cooled by exchanging heat with the lower temperature rich solution 176, before being delivered onto the solution cooler 180. After being cooled, the lean solution 178 can then flow back to the absorber 170 for reuse.

The solution reboiler 176 continuously extracts the carbon dioxide absorbed in the rich solution, by using the heat from the COGEN Plant 12, effectively regenerating the lean solution for continuous recirculation. The extracted low pressure carbon dioxide, which is separated from the solution, is compressed by the compressor 182 and directed for oil production as high-pressure carbon dioxide 184. As such, it can be delivered either to the oil production, gathering and injection system 68 and/or to the satellite oil fields 62. Power for the compressor 182 can be supplied from the power distribution system 50.

In order to make the process 10 more efficient, the heat exchanger 174 is used to regulate the temperature of both the rich solution with carbon dioxide and the lean solution, without carbon dioxide by exchanging high temperature of the lean solution (lowering its temperature) with the lower temperature rich solution (raising its temperature). In order to meet the absorber column input requirements, the lean solution is further cooled with the solution cooler 180, which operates with the chilled water supplied through the absorption chiller 130. The exhaust flue gas, after passing through the absorber 170 contains about 90% less carbon dioxide, can then be vented into the atmosphere with the very low concentration of carbon dioxide.

Figure 4:
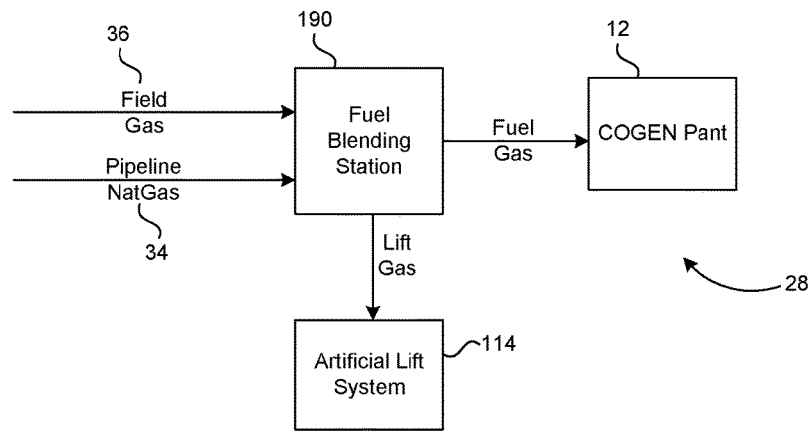
FIG. 4 is a block diagram showing the operation of the fuel supply system associated with the enhanced oil recovery process of the present invention.

FIG. 4 shows the fuel supply system 28 of the enhanced oil recovery process of the present invention. As can be seen, either the field gas 36 and or the natural gas from the pipeline natural gas 34 can be supplied to the fuel blending station 190. The fuel supply for the COGEN Plant 12 is custom configured for each operation. The fuel supply should be sufficient to operate the COGEN Plant 12. The natural gas pipeline is the primary source of hydrocarbon fuel for those plants operated on natural gas, the preferred configuration. The gas processing facility 40 provides the field gas 36 that can supplement the fuel of the pipeline supplied natural gas 34 and can be combined at the fuel blending station 190. If required by the oil field 72, the system may supply natural gas (i.e. lift gas) for the artificial lift system 114.

Figure 5:
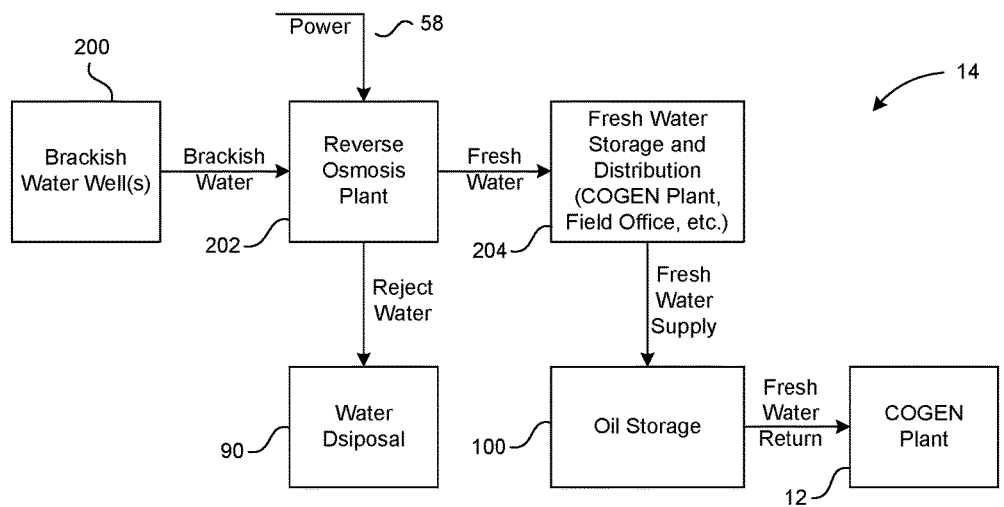
FIG. 5 is a block diagram showing the operation of the water supply plant associated with the process of the present invention.

FIG. 5 shows the water supply plant 14 of the enhanced oil recovery process of the present invention. The COGEN Plant 12 and the carbon dioxide capture plant 48 require a fresh water supply. This can be provided by a brackish water well(s) 200. This brackish water well(s) 200 can be located on or near the same site as the COGEN Plant 12. The well 200 will normally be drilled and completed into a brackish water aquifer that would not be considered a part of the local underground fresh water supply. The water will be processed to achieve the required salinity levels and removal of minerals and other components that would be incompatible with the operator requirements of the process 10 of the present invention. In most cases, a reverse osmosis plant 202 will be operated as the primary means of processing water. The process will be supplemented as needed on the particular project. The reject water of the reverse osmosis plant 202 will be sent to water disposal 90. The reverse osmosis plant 202 receives power 58 from the power distribution system 50. The fresh water from the reverse osmosis plant 202 can then be delivered to a fresh water storage and distribution facility 204. The relatively low temperature of the underground processed water will be used in a heat exchanger to reduce the temperature of the stored oil in the oil storage 100 to achieve the required sales temperature. As a result, the temperature of the underground water will be raised so as to basically "preheat" the water prior to being used in the processes that require the water temperature to be raised further.

Figure 6:
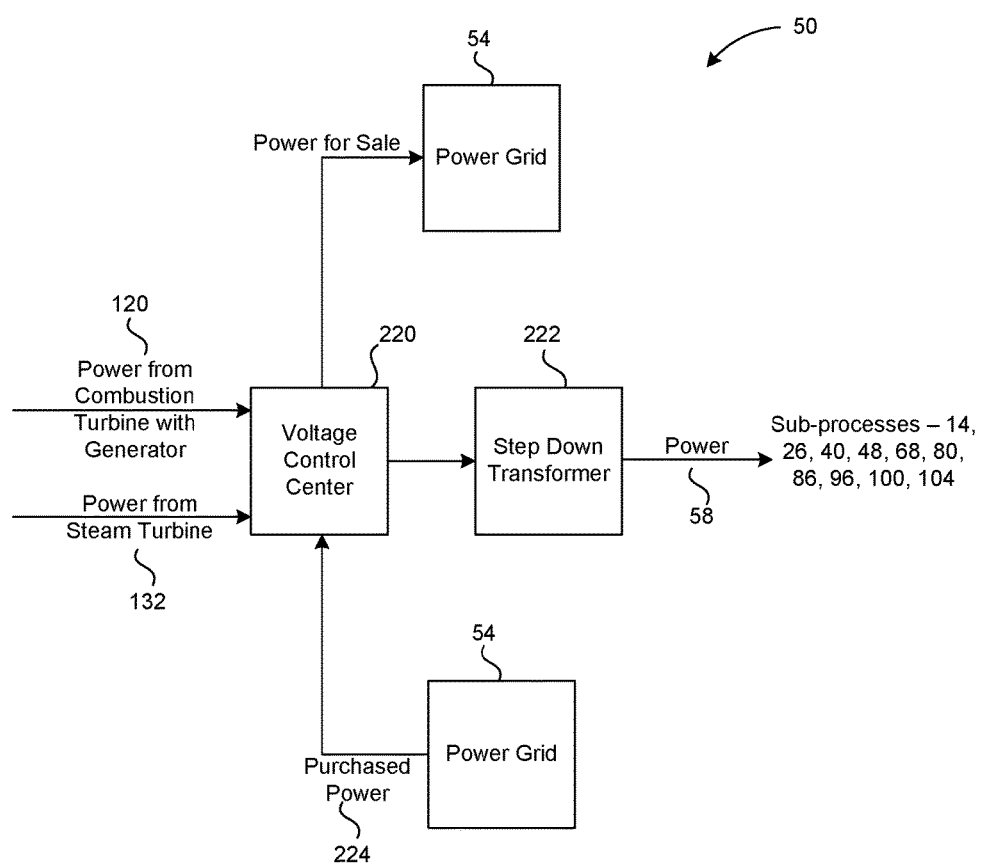
FIG. 6 is a block diagram showing the operation of the power distribution system of the enhanced oil recovery process of the present invention.

FIG. 6 shows the power distribution system 50 of the enhanced oil recovery process of the present invention. The power produced by the combustion turbine with generator 120 and from the steam turbine 132 is combined with an appropriate phase and voltage at the voltage control center 220. The voltage control center 220 is part of the power distribution system 50. The voltage control center 220 facilitates distribution of power to the various sub-processes shown in FIG. 1. In particular, the power 58 will be processed by a step-down transformer 222. Power that is generated in excess of the requirements of the process of the present invention can be sold as power to the power grid 54. For periods of scheduled maintenance, the power distribution system 50 may provide a source of back-up power or may use the local power grid 54 as a source of back-up power. In other words, power is purchased from the utility as purchased power 224.

Figure 7:
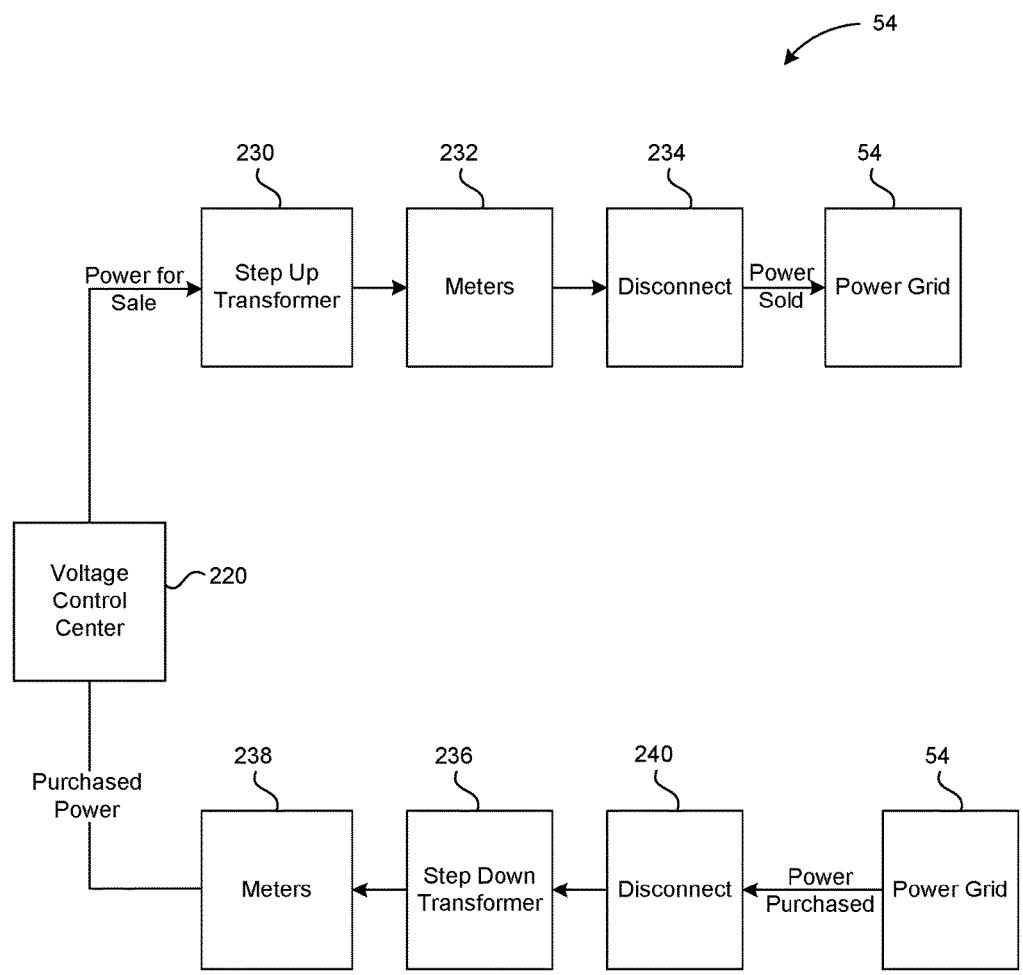
FIG. 7 is a block diagram showing the power grid sub-process of the enhanced oil recovery process of the present invention.

FIG. 7 is a flowchart showing the power grid 54. The power produced by the COGEN Plant 12 that is not required for the process of the present invention can be transmitted to the local power grid 54 for sale on a merchant basis with proceeds offsetting the cost of operations. The excess power available for sale will be managed and scheduled into the local power grid 54 on a basis that maximizes the revenue from the sale of excess power. The step-up transformer 230 matches the produced power to the power voltage of the grid which is measured by the meters 232. The disconnects 234 and 240 are a requirement of the grid operator at all inlets and outlets to the grid and help enhance the safety and reliability of the grid system. In cases of back-up power requirements from the power grid 54, the step-down transformer 236 will lower the voltage to meet the process requirements. This voltage is measured by meters 238 prior to passing to the voltage control center 220.

Figure 8:
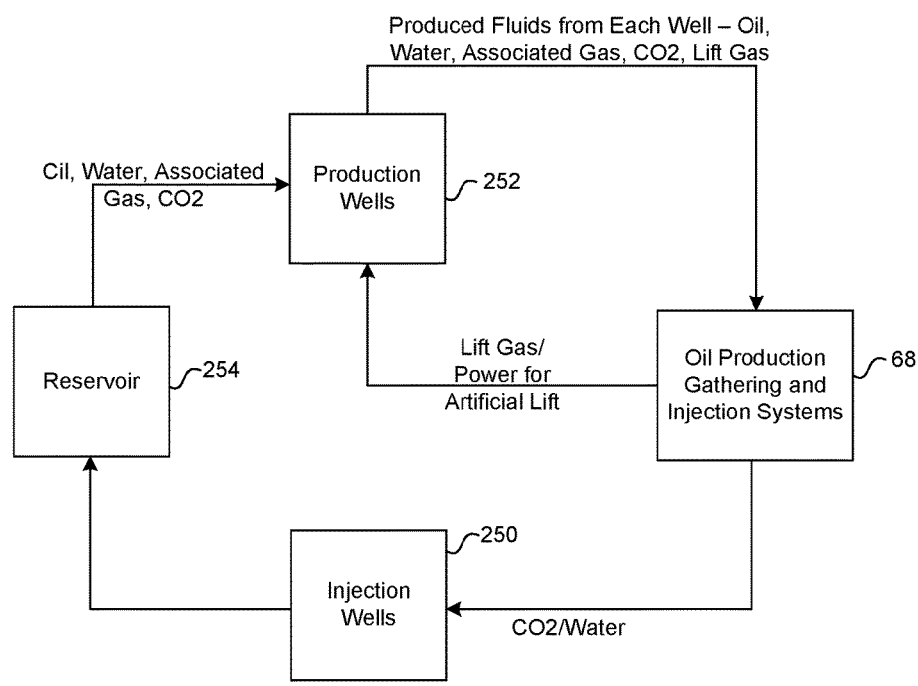
FIG. 8 is a block diagram showing the oilfield sub-process of the enhanced oil recovery process of the present invention.

The carbon dioxide produced by the field-located facilities will be used for the purpose of enhanced oil recovery operations. There are various sub-processes which are dependent on the field-located facilities for power, heat and fresh water. In the process of the present invention, there are various sub-processes shown hereafter. In particular, FIG. 8 illustrates the oil field 72. The oilfield 72 is defined on the surface by geographic areas under lease from the mineral rights owners and below the surface by physically-defined geological formation, referred to as "reservoirs". The reservoirs will contain hydrocarbons. Some of these reservoirs would be the subject of enhanced oil recovery efforts involving the process 10 of the present invention. An oilfield under enhanced oil recovery operation will contain injection wells 250 which inject carbon dioxide or water into the reservoir and production wells 252, which produce the reservoir fluids to the surface. The oil production, gathering and injection system 68 will receive these produced fluids and send the lift gas, if required, for artificial lift to production wells. As can be seen in FIG. 8, the carbon dioxide and/or water are injected through injection wells 250 into the reservoir 254. The oil, water, carbon dioxide, and associated gases are then delivered outwardly of the reservoir through the production wells 252.

FIG. 9 shows the process of the artificial lift system 114. The production from each individual producing well involved in the process 10 of the present invention may flow without assistance by the reservoir pressure alone. However, if the reservoir pressure is not sufficient for the producing well to flow on its own, the producing well may require artificial lift. The process of the present invention would be able to operate in artificial lift methodology, known as gas lift, in a unique manner, not otherwise possible without the field located COGEN Plant 12. The gas lift system will operate with natural gas supplied by a pressure-regulated side stream from the natural gas pipeline that supplies natural gas as a fuel to the COGEN Plant 12. The pressure-regulated natural gas will be directed to the producing wells and injected into the wellbore casing of a producing well that requires artificial lift. The producing well will be configured to allow injection of the natural gas in the wellbore to lift the fluids to the surface.

Figure 9A:
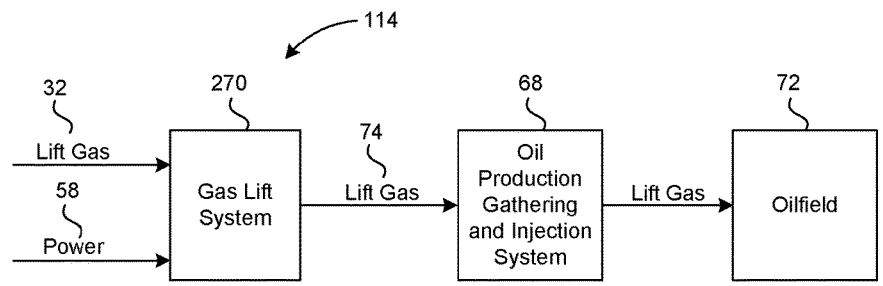
FIGS. 9A, 9B, 9C and 9D are flowcharts showing the sub-process of the artificial lift system of the enhanced oil recovery process of the present invention.
Figure 9B:
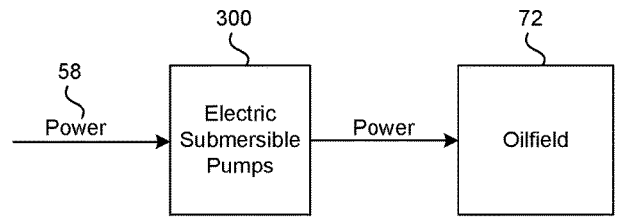
Figure 9C:
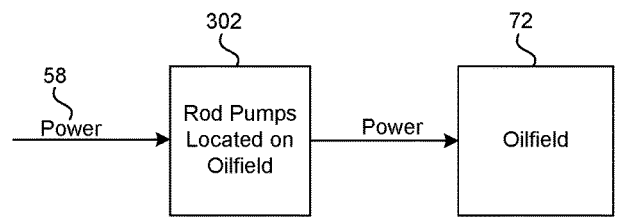
Figure 9D:
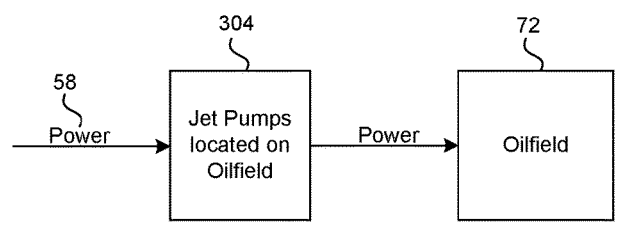

In the execution of the sub process shown in FIGS. 9A, the natural gas purchased for the gas lift system will be supplied from natural gas pipeline. After having served to assist in the production of the produced fluids the lift gas will combine with the produced fluids and gases, pass through the Central Production Facility 80, the CO2 Recycle Plant 96, the Gas Processing Plant 40 and then be blended back into the fluid supply system 28 of the process. As a result, the cost will be included in the total purchased natural gas for the COGEN Plant 12, with no incremental operating cost for the purpose of gas lift. The result is a very low cost gas lift operation, for which the supply volume is just temporarily used for gas lift before being used as a fuel. The field-located COGEN Plant 12 enables this gas lift system 270 to function without the required gas recycle facility of industry typical gas lift systems. This is a major cost savings as compared to any industry typical gas lift system. In particular, FIG. 9A shows the lift gas 32 and the power 58 as delivered to the gas lift system 270. The lifted gas 74 is then delivered to the oil production, gathering and injection system 68. The lift gas can then be delivered to the oilfield 72. FIG. 9B shows power 58 is used to power electric submersible pumps 300. As such, the power is delivered to the oilfield 72 where the pumps are located down hole in production wells. FIG. 9C shows the power 58 as delivered for the operation of a rod pumps 302 located on the oilfield. The power can be delivered to the oilfield 72 where the rod pumps are located atop each production well. FIG. 9D shows jet pumps 304 that are supplied with power 58. The power is delivered to the oilfield 72 where the jet pumps are located at or near the production wells.

Figure 10:
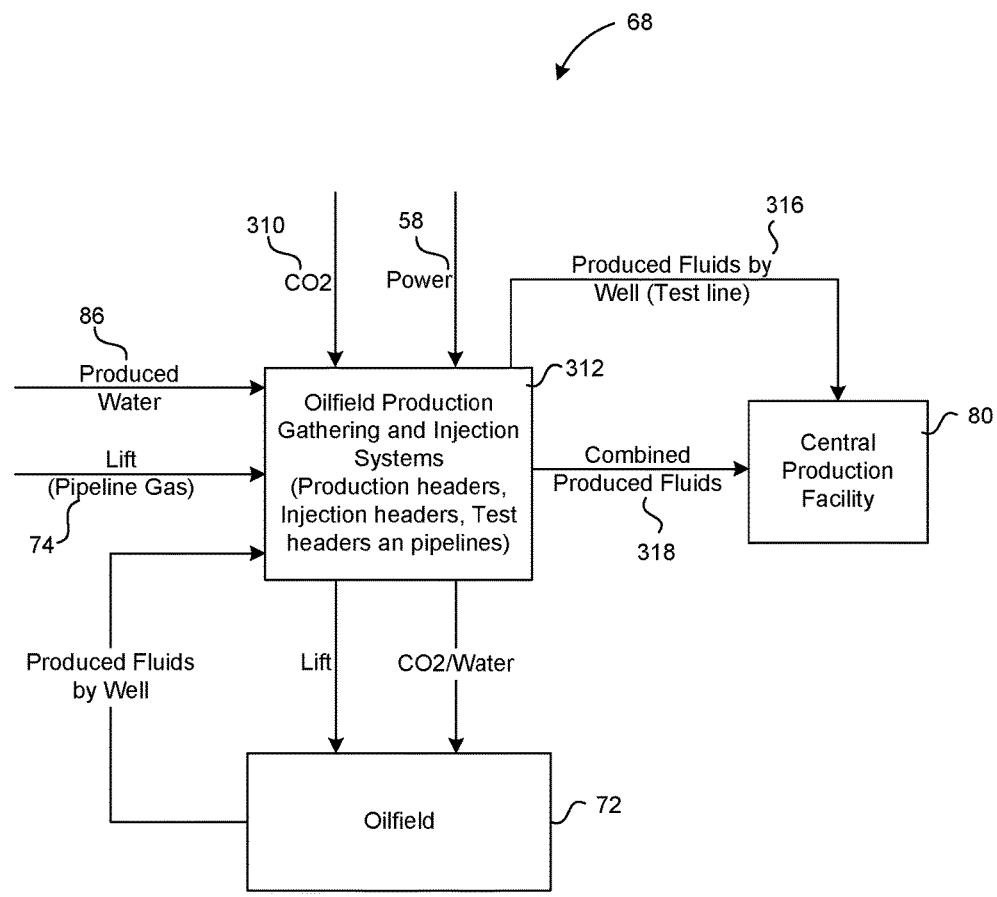
FIG. 10 is a flowchart showing the oil production, gathering and injection system sub-process of the enhanced oil recovery process of the present invention.

FIG. 10 shows the oilfield production, gathering and injection system 68 as shown in FIG. 1. High-pressure carbon dioxide 310 will be produced, as described hereinbefore, by the carbon dioxide capture plant 48 and by the carbon dioxide recycle plant 96. The high-pressure carbon dioxide can be distributed by way of pipelines to a distribution header system in the Oilfield Production and Gathering Systems 312 and then on to each of the carbon dioxide injection wells in the oilfield 72. The carbon dioxide distribution and injection system is coordinated with the operations that inject produced water from the produced water plant 86. The power distribution system 50 provides the power 58 required by the Oilfield Production and Gathering Systems 312. The combination of the water injection and the carbon dioxide injection causes hydrocarbons to be released in the various reservoirs of the oilfield 72 that would otherwise not be producible.

In FIG. 10, the pipeline gas 34 is also supplied to the oilfield production, gathering and injection system 312 for the use as a lift gas, if needed. The produced fluids 316, from a selected production well, can be directed periodically to flow through a test line to the central production facility 80 for a typical flow test analysis. The combined produced fluids 318 from producing wells not in the test mode will flow directly to the central production facility 80.

The produced fluid stream from each producing well involved in the process 10 of the present invention is collected in a gathering system configured for each operation. The gathering system is designed to enable routine testing of the oil, water, gas production from each producing well, and also efficiently combines the produced fluids from each producing well, directing it to the central production facility 80. In the case of gas lift, the injection headers, part of the current process, will send the lift gas 74 for each production well as per the well requirements. The lift gas is supplied by the artificial lift system 114.

Figure 11:
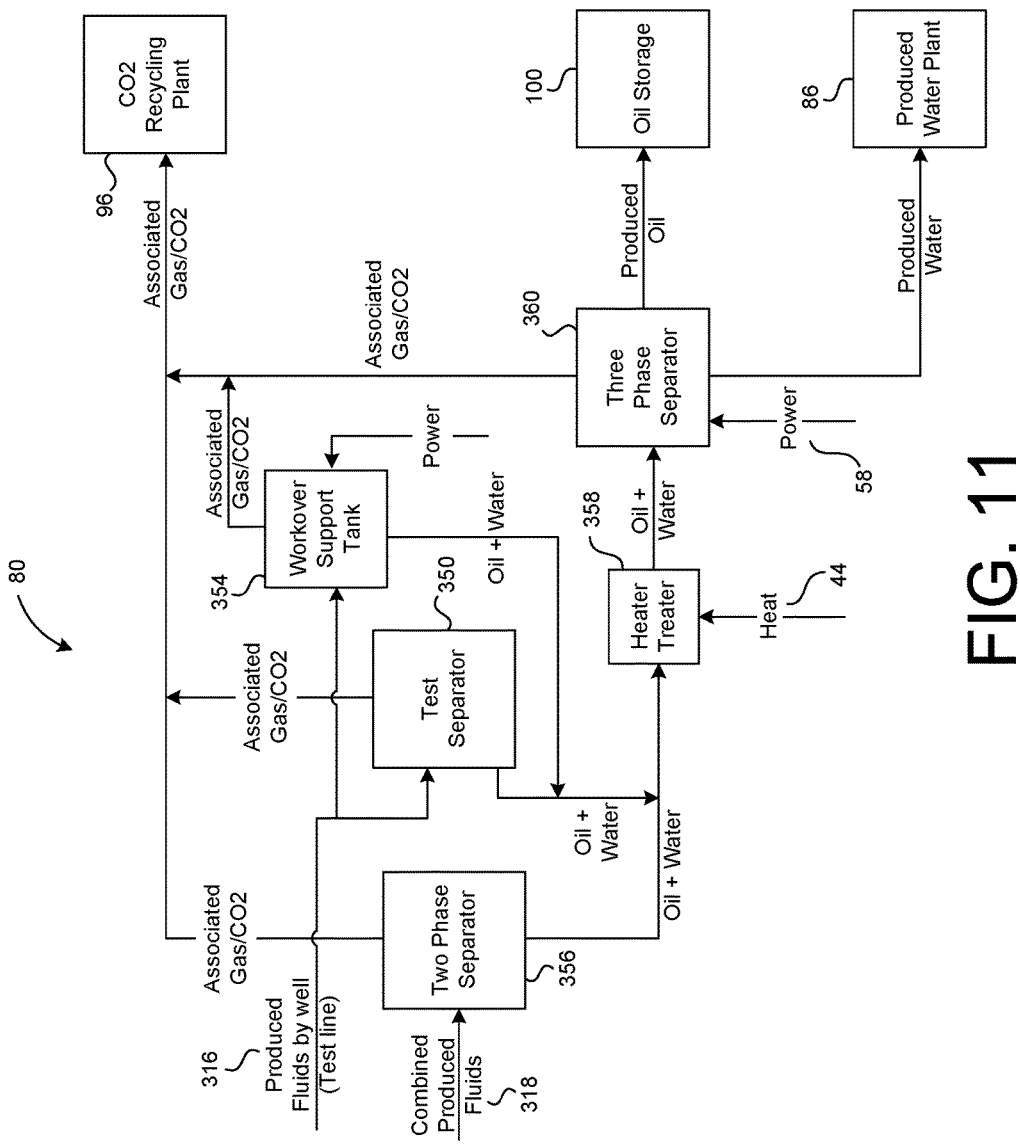
FIG. 11 is a flowchart showing the central production facilities sub-process of the enhanced oil recovery process of the present invention.

FIG. 11 illustrates the operation of the central production facility 80. Each central production facility 80 (e.g. occasionally more than one will be required) is designed for the particular requirements of a reservoir and includes a well test separator 350 connected via a well test line 316 to the header located in the oilfield. This allows each well to be isolated and the produced fluids to be transported to the central production facility 80 for testing and subsequent recombination with other produced fluids. Individual well tests are necessary to monitor the changing balance of oil, water, associated gases and carbon dioxide volumes in the produced fluids that provides the information necessary for oilfield flow and injection adjustments. The oilfield production, gathering and injection system 68 will allow each producing well to be isolated and the produced fluids to be transported to the central production facility 80 via a test line into a test separator 350 that separates the oil, water, associated gases and carbon dioxide gas produced for a flow test that is conducted on each well. In addition, the test line will be connected to a workover support tank 354 that allows a well to flow against minimal backpressure following a workover procedure. For accurate accounting and efficient operations, there may often be more than one central production facility 80 and, in such cases, the facilities together will be considered the central production facility. All producing wells in a reservoir, other than those currently on test, flow first into a two-phase separator 356 that separates the majority of the gas stream (at a relatively high pressure) from the produced fluids (i.e. water and oil). Depending upon the oil characteristics of a given reservoir, the produced fluids may need to be heated in a heater/treater 358 prior to entering the three-phase separator 360. This separator 360, which operates at a lower pressure, separates the water from the oil, as well as allowing the majority of the remaining produced gas to be separated. The oil is sent to the oil storage 100, the water is sent to the produced water plant 86, and the combined produced gas/carbon dioxide is sent to the carbon dioxide recycling plant 96. The power distribution system 50 provides the power 58 required to operate the central production facility 80 and the COGEN Plant 12 also provides the heat 44 to the heater/treater 358.

Figure 12:
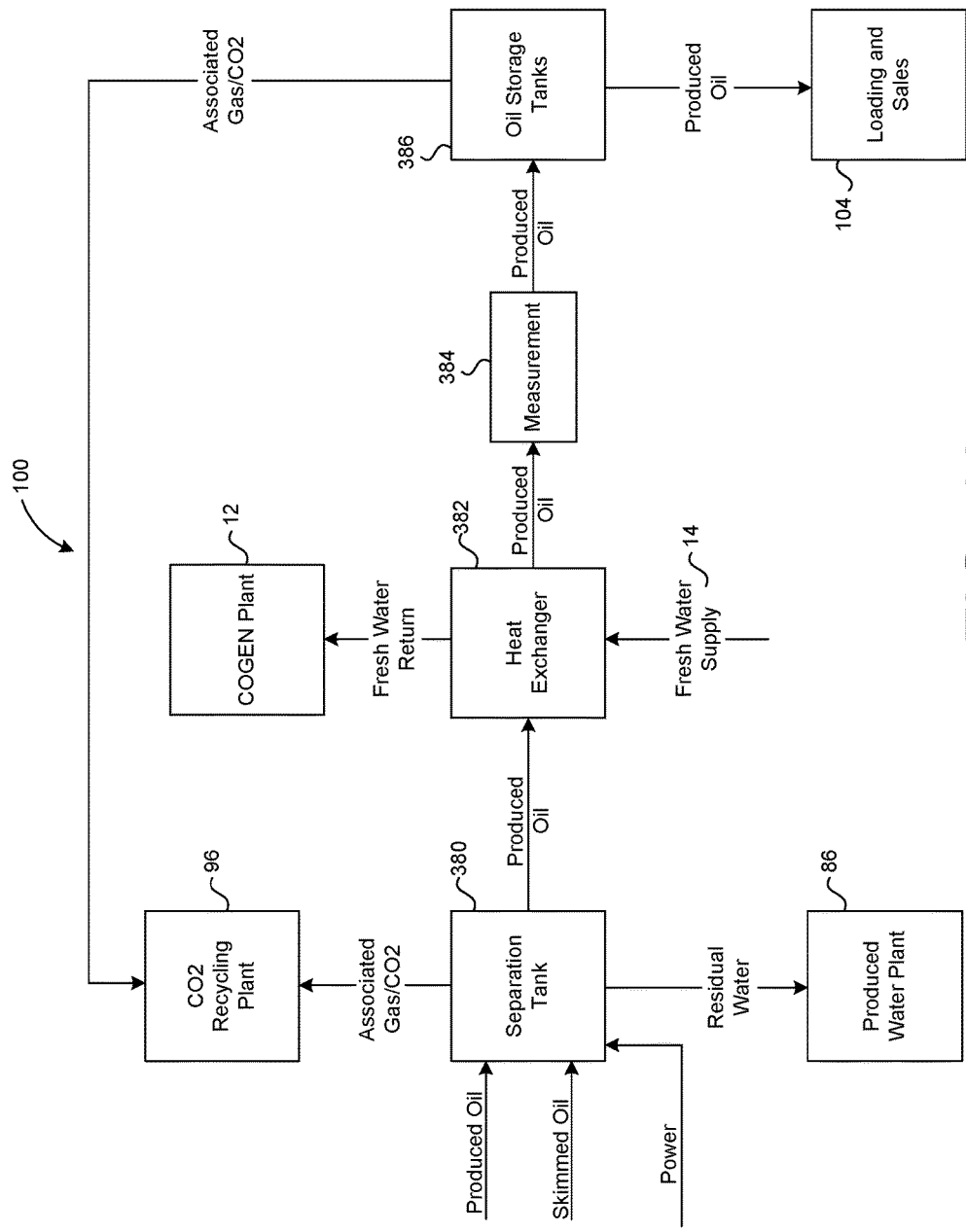
FIG. 12 is a flowchart showing the oil storage sub-process of the enhanced oil recovery process of the present invention.

FIG. 12 shows the oil storage operations 100 of the process for enhanced oil recovery shown in FIG. 1. The produced oil is directed into an array of oil storage tanks, which are custom configured for each operation. A separation tank 380 is designed to separate any remaining water and associated gas from the produced oil prior to being available for sale. The residual water separated from the produced oil is directed to a produced water plant 86 and the associated gas/carbon dioxide, separated from the produced oil, is directed to the carbon dioxide recycle plant 96. A heat exchanger 382 is used to reduce the temperature of the separated produced oil before being measured at the measurement 384 and stored in the oil storage tanks 386. The cool fresh water from the water supply plant 14 is used in the heat exchanger 382 to reduce the temperature of the produced oil and to pre-heat itself before going on to the COGEN Plant 12. The vapor recovery system installed in the oil storage tanks 386 will capture the associated gas/carbon dioxide released from the oil at low storage pressure and send it to the carbon dioxide recycling plant 96. The produced oil stored in the storage tanks 386 is ready for sale and will be directed to loading and sales 104.

Figure 13:
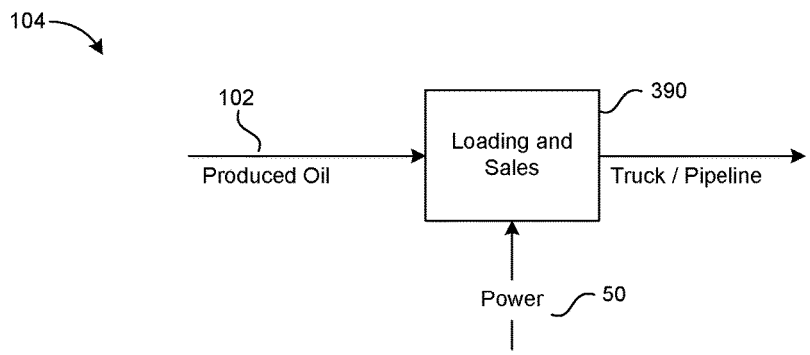
FIG. 13 is a flowchart showing the oil loading and sales sub-process of the enhanced oil recovery process of the present invention.

FIG. 13 shows the sub-process of loading and sales 104. The produced oil 102 from the oil storage 100 is directed to loading and sales 390 so as to be loaded onto a truck or delivered to a pipeline. The power distribution system 50 can supply power in the case of either the pipeline transport of oil or the loading of oil onto trucks.

Figure 14:
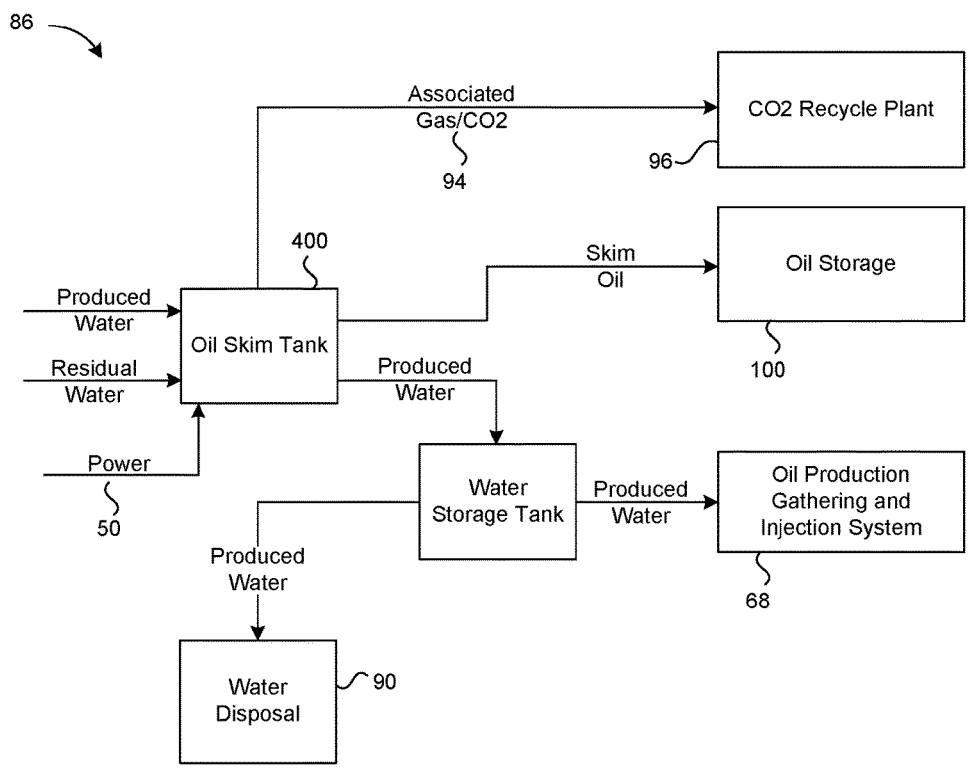
FIG. 14 is a flowchart showing the produced water plant sub-process of the enhanced oil recovery process of the present invention.

FIG. 14 shows the produced water plant 86, a sub-process of the enhanced oil recovery process 10 of the present invention. The produced water is received in a storage facility that is custom configured for the requirements of each operation. The produced water plant 86, by design, separates any remaining oil and gas from the produced water in the oil skim tank 400. It then directs the skim oil to the oil storage 100. The oil skim tanks are also equipped with a vapor recovery system and any associated gas/carbon dioxide recovered is delivered to the carbon dioxide recycle plant 96. The produced water is directed to either the oil production, gathering and injection system 68 for injection back into the producing reservoir and or to the extent not needed will be directed to the water disposal 90 where the produced water will be combined with any reject water from the water supply plant 14. It can then be injected to an underground geological formation other than the producing reservoir/ freshwater aquifers. The power required by the produced water plant 86 is provided through the power distribution system 50.

Figure 15:
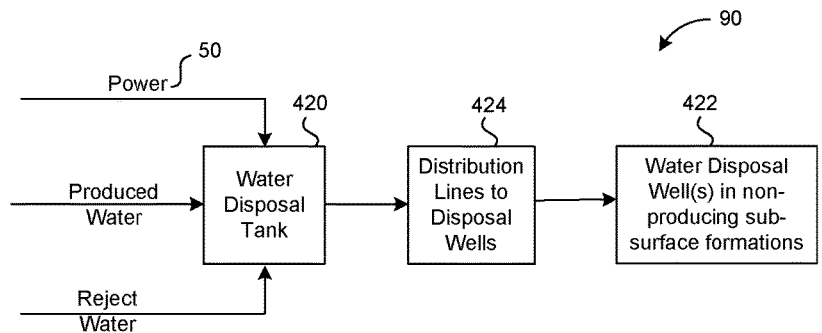
FIG. 15 is a flowchart showing the water disposal sub-process of the enhanced oil recovery process of the present invention.

FIG. 15 shows the water disposal facility 90 in the process 10 of FIG. 1. The produced water volumes from the produced water plant 86, which do not need to be recycled back into the hydrocarbon-producing reservoirs, are directed to the water disposal tanks 420 where they are combined with the reject water from the water supply plant 14. The combined water is then directed to the disposal wells 422 via distribution lines 424 and then injected into other geological formations not involved in the enhanced oil recovery operations. The power required by the water disposal system is provided through the power distribution system 50.

Figure 16:
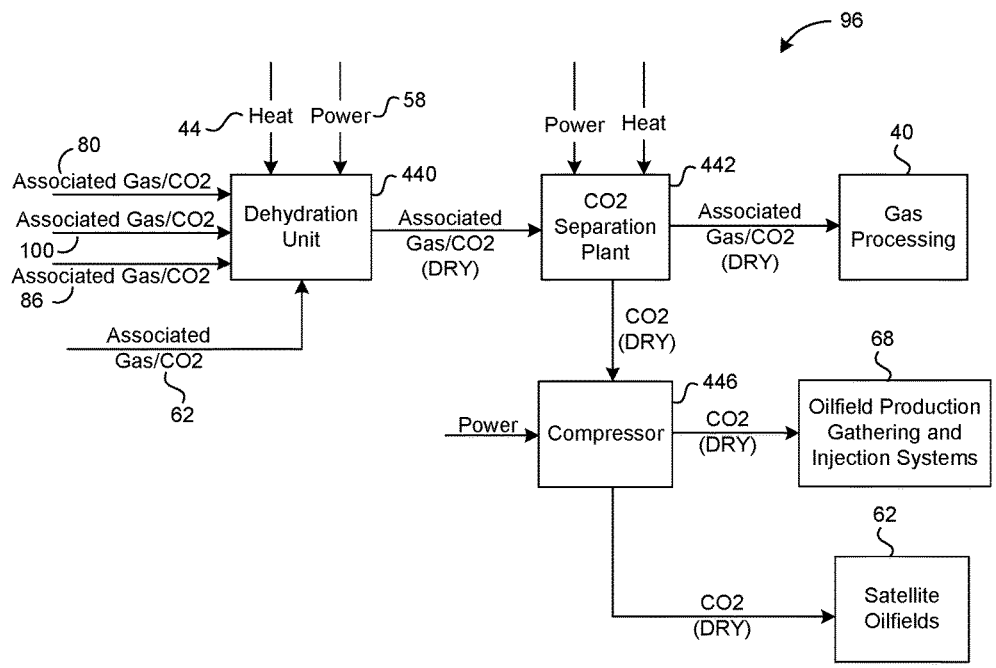
FIG. 16 is a flowchart showing the carbon dioxide recycle plant sub-process of the enhanced oil recovery process of the present invention.

FIG. 16 shows the recycle plant 96 of the enhanced oil recovery process 10 of FIG. 1. The associated gas/carbon dioxide stream from the central production facility 80, the oil storage 100 and the produced water plant 86 and the Satellite Oilfields 62 is combined together and dehydrated in the dehydration unit 440. The associated gas is then separated from the carbon dioxide in the carbon dioxide separation plant 442. The carbon dioxide separation plant 442 is custom configured for each operation. The associated gas separated from the carbon dioxide at the carbon dioxide separation plant 442 is directed to gas processing 40. The carbon dioxide separated from the associated gas is directed to the carbon dioxide compressor station 446 before being directed to either the oil production, gathering and injection system 68 for re-injection into the producing reservoirs and or to the producing reservoirs of satellite oil fields 62. The power distribution system 50 provides power to the carbon dioxide recycle plant 86. The COGEN Plant 12 provides heat required by the carbon dioxide recycle plant.

Figure 17:
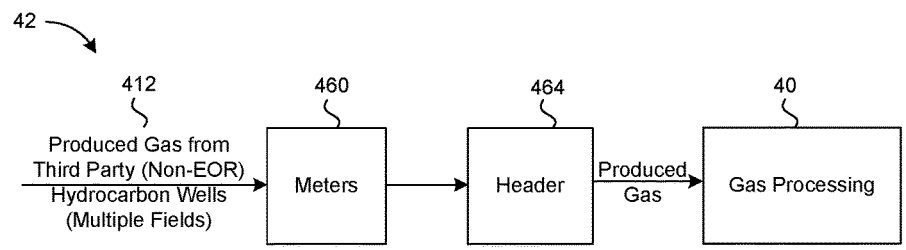
FIG. 17 is a flowchart showing the field gas gathering sub-process of the enhanced oil recovery process of the present invention.

FIG. 17 shows the field gathering operation 42 of the enhanced oil recovery process 10 of FIG. 1. The enhanced oil recovery operation will often be located in an area where other oilfield operations are active and field gas not involved in the enhanced oil recovery operation is being produced and available for purchase. The field-located COGEN Plant 12 provides a unique opportunity to purchase this low-value unprocessed gas, which can be combined with the associated gas volumes of the subject enhanced oil recovery operations after dehydrating and then be combined with and offset the purchased natural gas 34 volumes pipeline supplied to fuel the COGEN Plant. 12. The field gas gathering system 42 will enable the metering by meters 460 of field gas purchased from the various sources 462 before the field gases are combined at the header 464 and directed to the gas processing plant 40 for dehydration.

Figure 18A:
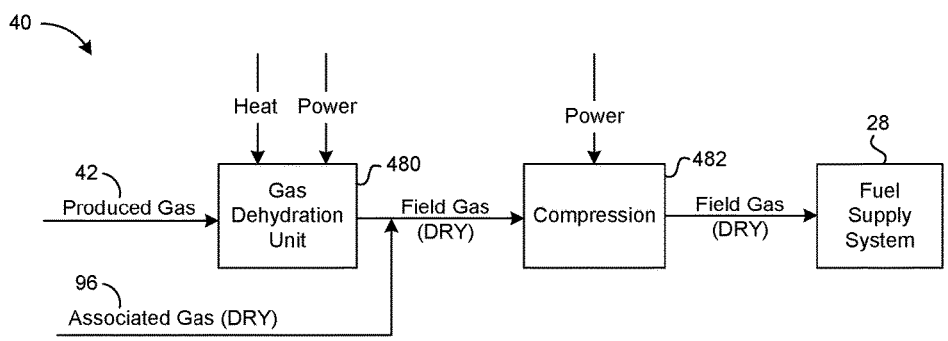
FIGS. 18 (A)-(B) are flowcharts showing the sub-processes associated with gas processing in the enhanced oil recovery process of the present invention.
Figure 18B:
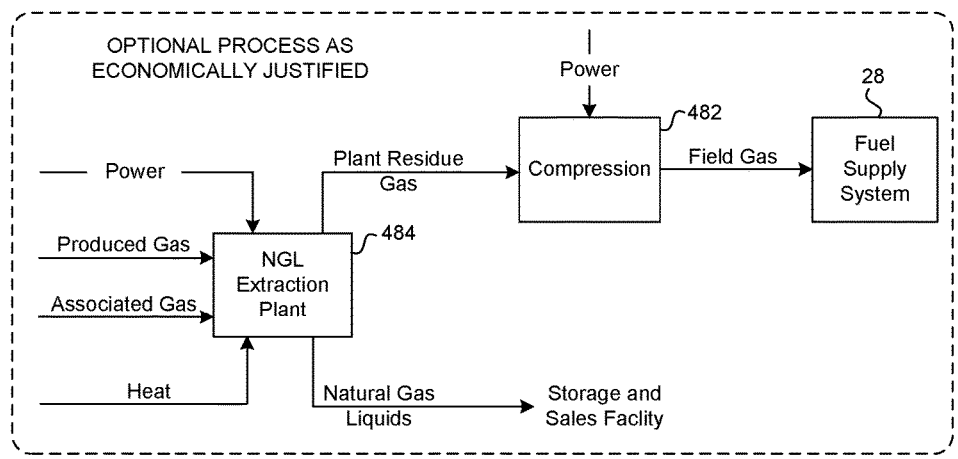

FIGS. 18A and 18B show alternative approaches to the gas processing operation 40. The gas processing facility will receive the dry associated gas from the carbon dioxide recycle plant 96 and the produced hydrocarbon gas from the field gas gathering system 42. The produced gas stream will be dehydrated first in the dehydration unit 480 and then combined with the associated gas (dry) stream and the combined gas stream is then compressed at the compressor 482. It is then metered before entering the fuel supply system 28 where it is combined with the pipeline-supplied natural gas. In certain cases, the economics will justify further gas processing that would separate the natural gas liquids (e.g. propane and butane) in the NGL extraction plant 484. The field gas stream from the gas processing facility will serve as a direct offset to the purchases of the natural gas pipeline supply. This unique capability can provide a significant cost savings to the enhanced oil recovery operations. The power distribution system 50 provides power for the gas processing facility 484 and the COGEN Plant 12 provides the heat required at the gas processing facility 40.

Figure 19:
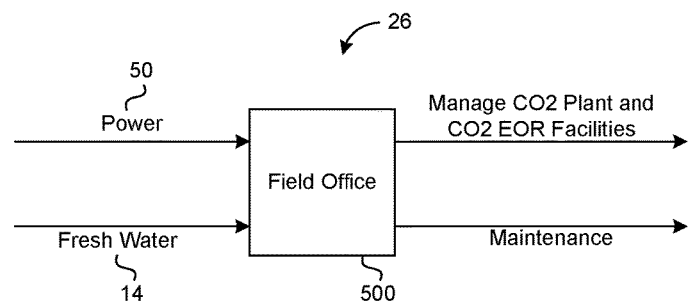
FIG. 19 is a flowchart showing the field office and maintenance facilities sub-process of the enhanced oil recovery process of the present invention.

FIG. 19 illustrates the field office and maintenance facilities sub-process 26 of the enhanced oil recovery process 10 of FIG. 1. There will be office buildings, maintenance buildings and supply buildings constructed on the same site or near the COGEN Plant 12. The management, oversight, safety, and maintenance of the enhanced oil recovery process will be carried out from these facilities. The power for the field office and the maintenance office 500 will be provided through the power distribution system 50. The water supply plant 14 provides fresh water to the field office 500.

Figure 20:
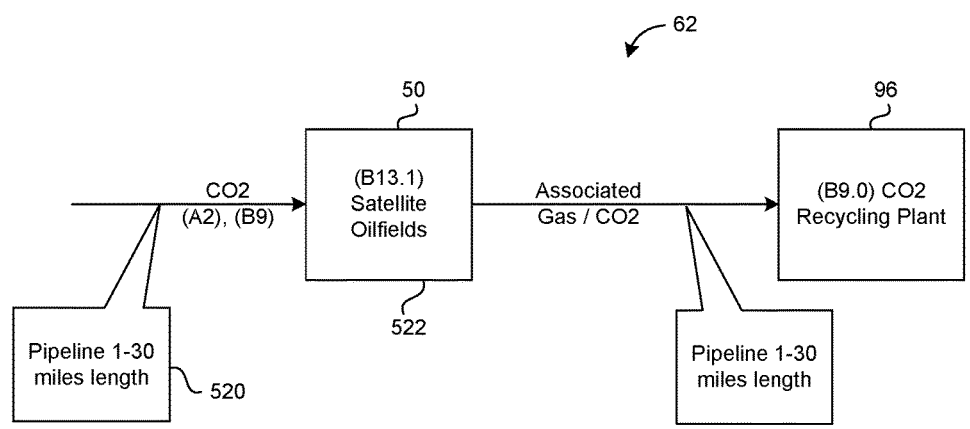
FIG. 20 is a flowchart showing the satellite oil fields sub-process of the enhanced oil recovery process of the present invention.

FIG. 20 shows the satellite oil fields sub-process of the enhanced oil recovery process of FIG. 1. The combined daily volume of the carbon dioxide captured and compressed by the carbon dioxide capture plant 48 and the carbon dioxide recycle plant 96 will eventually exceed the requirements of the hydrocarbon reservoir subject to these enhanced oil recovery operations. At some point in time, the combined daily volume of compressed carbon dioxide that exceeds the need will be considered to be surplus carbon dioxide. The most valuable use would be in enhanced oil recovery operations in neighboring oil fields. The process of the present invention provides for the capability to deploy the surplus carbon dioxide in the neighboring oil fields so as to allow the satellite oil fields to be serviced by the field located facilities of the present process. The process provides for the surplus carbon dioxide to be transported by pipeline 520 to the satellite oilfield 522 and for the associated gas/carbon dioxide produced in the satellite oil fields to be measured and transported back to the field-located recycle plant 96 for further processing. This would provide additional volumes of associated gas to be directed to the gas processing plant 40. As a result, the volume of field gas would increase so as to offset the purchases of pipeline-supplied natural gas and create additional savings to the enhanced oil recovery operations.

Figure 21:
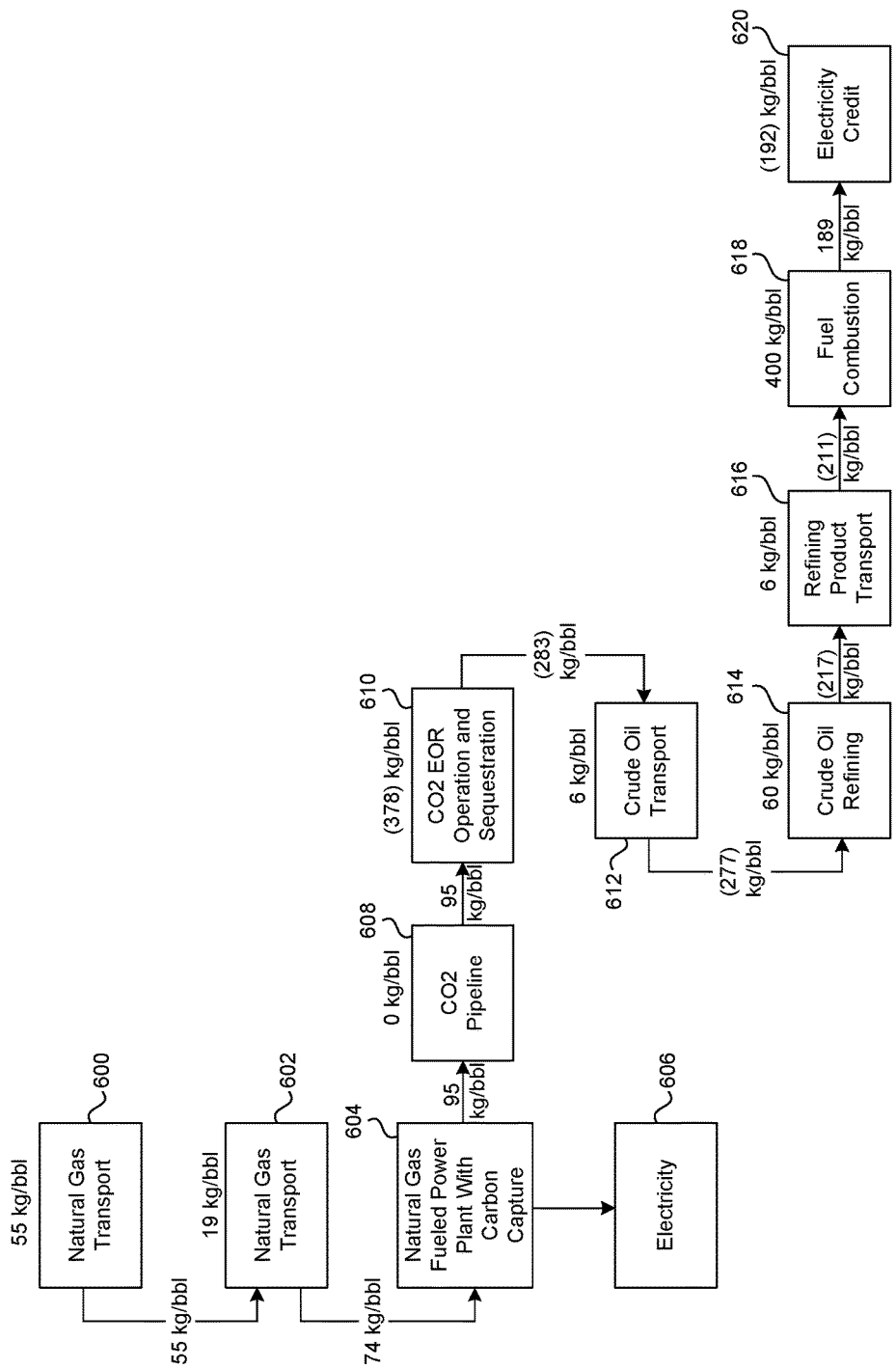
FIG. 21 is a block diagram illustrating how the enhanced oil recovery process of the present invention could achieve a negative carbon dioxide footprint.

FIG. 21 is a diagram showing how, in effect, the process of the present invention can actually result in a negative carbon footprint. Under continuing efforts to clarify what emissions in an oilfield should be considered as the stationary sources for the purposes of the Prevention of Significant Deterioration and Nonattainment New Source Review, as well as a major source in the Title V Program, much of the determination depends upon the definition of "adjacent". Needless to say, the EPA has taken the stance that all contribution portions of an oilfield emissions profile should be considered, whereas producers and state oil and gas regulatory agencies have contended that each emission source outside of the immediate central processing facility should be considered as separate emissions sources. The effect is such that whenever compressors, storage tanks, or dehydration units are located non-adjacent to the central facility, or in a field without a central facility, it would be considered its own site source and, in most instances, would be a minor source. A more recent EPA stance is that the field should be considered as a whole and in a field that includes multiple emissions sources, the aggregate of their emissions should be considered as a single source. If their totals were in excess of the limits allowed under a minor source permit, the oilfield would have to apply as a major source emitter.

Another source of emissions is the fugitive emissions associated with truck traffic on unpaved roads in the oilfield. It is contemplated that the plant location, as well as the plant access roads, will be paved, whereas in a normal oilfield all the roads to each one of the producing wells are unpaved. This process, through the use of centralized gathering, eliminates the large haul trucks that constantly travel a normal oilfield's unpaved roads to hold the oil and produced water. Additionally, the dust associated with these operations, as well as the particulates and other emissions associated with the use of heavy-duty trucks, is significantly reduced in the present invention.

By designing the entire process as a unit, remote emissions are significantly reduced or eliminated. The central processing facility, being a located adjacent to the COGEN Plant and the carbon dioxide capture plant, will receive permits based on the total emissions for the oilfield which will be the same as for the site.

In normal oilfield production facilities, the direct and indirect emissions can be quite significant. The present invention reduces the overall emissions to a fraction of what is normally emitted from an oilfield production facility, be it normal primary production, secondary production, non-conventional production, or other enhanced oil recovery production. The production of oil is an energy-intensive operation that almost always utilizes the associated gas, sometimes in combination with pipeline-purchased gas, to furnish the heat requirements needed for gas dehydration, oil/water separation, oil dehydration and desalting, as well as gas treatment and gas processing. The process of the present invention derives all of its heat requirements from the COGEN Plant instead of the direct firing used in normal oil and gas operations.

Oil and gas production also has high energy needs, be it purchased power or generated power, or by engines that are driven to drive the pumps and compressors required throughout the production process. The process of the present invention captures approximately 90% of the carbon dioxide contained in the exhaust flue gas of the COGEN Plant; the most direct advantage is the reduction of carbon dioxide emissions. This reduction is either from the source where the power is generated (i.e. indirect emissions) or the site where the internal combustion engines for the compressors and pumps are utilized (i.e. direct emissions).

In addition, produced crude often requires additional heat to separate the produced crude from the produced water and to drive off as much associated gas as possible. This associated gas can include carbon dioxide in the case of enhanced oil recovery operations. The separated crude may further require additional processing for dehydration and desalting that utilizes even more heat.

Recognizing that all crude types are different and the emissions for extraction and processing will vary, the emissions for each specific oilfield will differ. However, an extensive study of the field where the amount of crude produced should equate favorably with the increase in the amount of crude would be brought about using the carbon dioxide from a 100 megawatt COGEN Plant would result in an annual reduction of pollution as follows:

| Compound: | Emissions (TPY CO2e) |
|---|---|
| CO2 | 164,250 |
| CO | 115 |
| Methane (CH4) | 79 |
| N2O | 897 |
| Total | 165,341 |

In FIG. 21, the carbon footprint of the process of the present invention is illustrated. To arrive at these calculations, the carbon dioxide required to produce a barrel of oil in an analogous oilfield is calculated and the amount of power generated at the COGEN Plant so that when 90% of the carbon dioxide is captured and used become the basis for the calculations. In particular, in step 600, the carbon footprint for the natural gas production and processing is 55 kilograms per barrel of oil produced. This is the carbon footprint of the production before it is delivered to the pipeline. The natural gas transport for the natural gas used for the powering up the system of the present invention would be 19 kilograms per barrel. As such, a carbon footprint of 74 kilograms per barrel is delivered to the process 604 associated with the present invention. The process 604 will have a carbon footprint of 21 kg per barrel. However, the process 604 can produce electricity 606 as an offset to the carbon footprint. A total of 95 kilograms per barrel will be delivered to the carbon dioxide pipeline 608. There is no carbon footprint associated with the carbon dioxide pipeline since no energy is consumed by the transport of pressurized carbon dioxide. A total of 95 kilograms per barrel is delivered to the carbon dioxide enhanced oil recovery operation and sequestration step 610. This is a negative 378 kg per barrel of carbon footprint. The figure is derived by how much is emitted to the atmosphere per barrel produced. The negative numbers achieved by the amount of carbon that is actually delivered into the underground formation where it is sequestered therein. As such, rather than releasing the carbon into the atmosphere, the present invention retains a significant amount of the carbon in the reservoir in the earth. As a result, a negative carbon footprint of 283 kilograms per barrel is delivered to crude oil transport step 612. The crude oil transport has a carbon footprint of 6 kilograms per barrel based upon the fuel used in trucking and in pipelines. Ultimately, the crude oil refining step 614 will produce 60 kilograms per barrel of carbon footprint. The transport of the refined product 616 will have a carbon footprint of 6 kilograms per barrel. The fuel combustion 618 by cars, trucks, and other internal combustion engines will have a carbon footprint of 400 kilograms per barrel. As such, 189 kilograms of the carbon footprint will ultimately result from the process of the present invention. However, importantly, the electrical production 606 will produce an electrical credit 620 of 192 kilograms per barrel based upon current average carbon dioxide emissions of all power generators (including renewables) on the U.S. Grid. As such, the carbon footprint associated with the entire scope of the process of the present invention will actually be a negative number.

The foregoing disclosure and description of the invention is illustrative and explanatory thereof. Various changes in the details of the illustrated construction or in the steps of the described method can be made within the scope of the appended claims without departing from the true spirit of the invention. The present invention should only be limited by the following claims and their legal equivalents.

I claim:

1. A process for producing carbon dioxide for use in hydrocarbon recovery, the process comprising:
   transporting a combustion turbine generator to an oilfield, the combustion turbine generator having a capacity of no more than 175 megawatts;
   operating said combustion turbine generator in combined cycle so as to produce steam and power and carbon dioxide;
   injecting the carbon dioxide into a reservoir located within said oilfield so as to produce hydrocarbons from said reservoir; and
   transmitting the power to a utility or for use by equipment at said oilfield.

2. The process of claim 1, the step of transporting comprising:
   placing the combustion turbine generator onto a bed of a trailer of a truck;
   moving said truck and said combustion turbine generator along a roadway toward said oilfield; and
   removing said combustion turbine generator from said trailer when said truck reaches a desired location at said oilfield.

3. The process of claim 1, said combustion turbine generator having a heat rate of between 7,500 and 12,000 BTU's/hour.

4. The process of claim 1, further comprising:
   compressing the carbon dioxide prior to the step of injecting.

5. The process of claim 4, further comprising:
   combining the carbon dioxide from said combustion turbine generator with a solution;
   reboiling the combined solution and the carbon dioxide so as to release carbon dioxide from the solution; and
   passing the released carbon dioxide to said compressor.

6. The process of claim 5, the step of reboiling comprising:
   passing the steam from said combustion turbine generator so as to exchange heat with the solution so as to elevate a temperature of the solution such that the carbon dioxide is released therefrom.

7. The process of claim 1, further comprising:
   completing a well at said oilfield so as to produce water from said well; and
   passing the water from said well to said combustion turbine generator so as to supply fresh water to the combustion turbine generator.

8. The process of claim 7, the water from said well being brackish water, the process further comprising:
   filtering the brackish water so as to produce the fresh water to said combustion turbine generator; and
   discharging reject water filtered from the brackish water.

9. The process of claim 1, further comprising:
   supplying fuel to said combustion turbine generator so as to cause said combustion turbine generator to operate in the combined cycle, said fuel being supplied from a natural gas pipeline.

10. The process of claim 1, further comprising:
    supplying fuel to said combustion turbine generator so as to cause said combustion turbine generator to operate in the combined cycle, said fuel being supplied from or supplemented by a field gas.

11. The process of claim 1, further comprising:
    passing the steam from said combustion turbine generator to a steam turbine;
    producing power from said steam turbine; and
    delivering the power to the utility or for use by the equipment at said oilfield.

12. The process of claim 1, the step of injecting comprising:
    injecting the carbon dioxide into said reservoir such that hydrocarbons and carbon dioxide are produced from said reservoir;
    separating the carbon dioxide from the hydrocarbons after the hydrocarbons and carbon dioxide are produced from the well;
    delivering the separated oil to oil storage; and
    returning the carbon dioxide toward a compressor prior to the step of injecting.

13. The process of claim 1, the step of injecting comprising:
    injecting the carbon dioxide into the reservoir so as to produce a mixture of hydrocarbons and water;
    separating the water from the hydrocarbons; and
    passing the separated hydrocarbons to oil storage.

* * * * *